United States Patent
Wong et al.

(10) Patent No.: US 7,962,144 B2
(45) Date of Patent: *Jun. 14, 2011

(54) METHOD FOR NETWORK COMMUNICATION ALLOWING FOR PERSISTENT REQUEST SLOTS FOR NETWORK NODES AS WELL AS SEPARATE INDENTIFICATION INFORMATION TO BE SENT FROM NODES

(75) Inventors: Gabriel K. Wong, Honolulu, HI (US); Po S. Tsui, Honolulu, HI (US)

(73) Assignee: GPNE Corp., Honolulu, HI (US)

( * ) Notice: Subject to any disclaimer, the term of this patent is extended or adjusted under 35 U.S.C. 154(b) by 412 days.

This patent is subject to a terminal disclaimer.

(21) Appl. No.: 11/757,879

(22) Filed: Jun. 4, 2007

(65) Prior Publication Data
US 2007/0229223 A1  Oct. 4, 2007

Related U.S. Application Data

(60) Continuation of application No. 11/668,922, filed on Jan. 30, 2007, now abandoned, which is a continuation of application No. 11/350,616, filed on Feb. 8, 2006, now Pat. No. 7,200,406, which is a continuation of application No. 09/847,005, filed on May 2, 2001, now Pat. No. 7,031,716, which is a continuation of application No. 09/594,662, filed on Jun. 15, 2000, now Pat. No. 6,282,406, which is a continuation of application No. 09/259,417, filed on Dec. 9, 1997, now Pat. No. 6,108,520, which is a continuation of application No. 08/608,629, filed on Feb. 29, 1996, now Pat. No. 5,729,827, which is a division of application No. 08/264,973, filed on Jun. 24, 1994, now Pat. No. 5,542,115.

(51) Int. Cl.
*H04W 72/00* (2009.01)
(52) U.S. Cl. .......................................................... 455/450
(58) Field of Classification Search .................... 455/450
See application file for complete search history.

(56) References Cited

U.S. PATENT DOCUMENTS
3,755,782 A   8/1973   Haas
(Continued)

FOREIGN PATENT DOCUMENTS
EP   0 344 624 A2   6/1989
(Continued)

OTHER PUBLICATIONS

Defendant Samsung Telecommunications America, LLC's Invalidity Contentions filed Oct. 8, 2007 in the United States District Court for the Eastern District of Texas Court Case No. 6:07-cv-59.

(Continued)

*Primary Examiner* — Yuwen Pan
(74) *Attorney, Agent, or Firm* — Fliesler Meyer LLP

(57) ABSTRACT

A communication system is provided for communication between network nodes and a communication controller. In the network, a reservation request is transmitted from a node to the communication controller in an assigned timeslot. In response the controller provides a grant of permission to the requesting node to transmit packet data containing a message. The timeslot assigned to the requesting node is one of a series of timeslots occurring repeatedly on a separate frequency. The timeslots will be continuously available to receive requests from nodes irrespective of transmission of data from one node to the controller, or transmission of a grant from the controller to a node.

191 Claims, 13 Drawing Sheets

U.S. PATENT DOCUMENTS

| | | |
|---|---|---|
| 3,851,104 A | 11/1974 | Willard |
| 4,224,150 A | 9/1980 | Buriks |
| 4,251,865 A | 2/1981 | Moore |
| 4,340,961 A | 7/1982 | Capel |
| 4,345,491 A | 8/1982 | Hannon |
| 4,466,001 A | 8/1984 | Moore |
| 4,477,809 A | 10/1984 | Bose |
| 4,553,263 A | 11/1985 | Smith |
| 4,555,594 A | 11/1985 | Friedes |
| 4,603,418 A | 7/1986 | Townsend |
| 4,644,347 A | 2/1987 | Lucas |
| 4,644,351 A | 2/1987 | Zabarsky |
| RE32,365 E | 3/1987 | Sebestyn |
| 4,713,808 A | 12/1987 | Gaskill |
| 4,736,371 A | 4/1988 | Tejima |
| 4,742,512 A | 5/1988 | Akashi |
| 4,747,122 A | 5/1988 | Bhagat |
| 4,797,947 A * | 1/1989 | Labedz .......... 455/525 |
| 4,815,073 A | 3/1989 | Grauel |
| 4,823,123 A | 4/1989 | Siwiak |
| 4,845,491 A | 7/1989 | Fascenda |
| 4,870,402 A | 9/1989 | DeLuca |
| 4,875,038 A | 10/1989 | Siwiak |
| 4,882,579 A | 11/1989 | Siwiak |
| 4,914,649 A | 4/1990 | Schwendeman |
| 4,940,963 A | 7/1990 | Gutman |
| 4,940,974 A | 7/1990 | Sojka |
| RE33,417 E | 10/1990 | Bhagat |
| 4,978,944 A | 12/1990 | Andros |
| 5,012,469 A | 4/1991 | Sardana |
| 5,029,164 A | 7/1991 | Goldstein |
| 5,043,721 A | 8/1991 | May |
| 5,086,501 A | 2/1992 | DeLuca |
| 5,088,094 A | 2/1992 | Gravel |
| 5,103,445 A | 4/1992 | Ostlund |
| 5,109,400 A | 4/1992 | Patsiokas |
| 5,111,197 A | 5/1992 | Ichikawa |
| 5,117,449 A | 5/1992 | Metroka |
| 5,142,279 A | 8/1992 | Jasinski |
| 5,153,580 A | 10/1992 | Pollack |
| 5,166,929 A | 11/1992 | Lo |
| 5,170,487 A | 12/1992 | Peek |
| 5,197,125 A | 3/1993 | Engel |
| 5,206,855 A | 4/1993 | Schwendeman |
| 5,224,150 A | 6/1993 | Neustein |
| 5,247,700 A | 9/1993 | Wohl |
| 5,247,702 A | 9/1993 | Su |
| 5,260,986 A | 11/1993 | Pershan |
| 5,261,118 A | 11/1993 | Vanderspool, II |
| 5,267,244 A | 11/1993 | Messerschmitt |
| 5,276,682 A | 1/1994 | Van As |
| 5,276,703 A | 1/1994 | Budin |
| 5,278,833 A | 1/1994 | Crisler |
| 5,285,496 A | 2/1994 | Frank |
| 5,297,144 A * | 3/1994 | Gilbert et al. .......... 370/346 |
| 5,315,586 A | 5/1994 | Charvillat |
| 5,353,285 A | 10/1994 | Van Der Plas |
| 5,363,427 A | 11/1994 | Ekstrom |
| 5,384,777 A | 1/1995 | Ahmadi |
| 5,396,496 A | 3/1995 | Ito |
| 5,396,537 A | 3/1995 | Schwendeman |
| 5,420,864 A | 5/1995 | Dahlin |
| 5,420,909 A | 5/1995 | Ng |
| 5,440,555 A | 8/1995 | Momona |
| 5,461,627 A | 10/1995 | Rypinski |
| 5,463,675 A | 10/1995 | Gerszberg |
| 5,471,474 A | 11/1995 | Grobicki |
| 5,485,463 A | 1/1996 | Godoroja |
| 5,491,469 A | 2/1996 | Schwendeman |
| 5,499,243 A | 3/1996 | Hall |
| 5,502,721 A | 3/1996 | Pohjakallio |
| 5,521,925 A | 5/1996 | Merakos |
| 5,542,115 A | 7/1996 | Wong |
| 5,544,222 A | 8/1996 | Robinson et al. .......... 455/557 |
| 5,559,804 A | 9/1996 | Amada |
| 5,613,207 A | 3/1997 | Wilson |
| 5,613,212 A | 3/1997 | Wong |
| 5,677,909 A * | 10/1997 | Heide .......... 370/347 |
| 5,680,398 A | 10/1997 | Robinson |
| 5,689,807 A | 11/1997 | Wong |
| 5,729,827 A | 3/1998 | Wong |
| 6,108,520 A | 8/2000 | Wong |
| 6,122,527 A | 9/2000 | Robinson et al. .......... 455/557 |
| 6,243,071 B1 | 6/2001 | Shwarts |
| 6,282,406 B1 | 8/2001 | Wong |
| 6,481,634 B1 | 11/2002 | Zosimadis |
| 7,031,716 B2 | 4/2006 | Wong |
| 7,200,406 B2 | 4/2007 | Wong |
| 7,209,748 B2 | 4/2007 | Wong |
| 7,212,825 B2 | 5/2007 | Wong |

FOREIGN PATENT DOCUMENTS

| | | |
|---|---|---|
| EP | 0 344 624 A3 | 6/1989 |
| JP | 03-104429 | 5/1991 |
| JP | 03-140024 | 6/1991 |
| JP | 04-114521 | 4/1992 |
| JP | 04-252526 | 9/1992 |
| JP | 05-130021 | 5/1993 |
| JP | 05-268155 | 10/1993 |
| JP | 05-327580 | 12/1993 |
| WO | WO 92/09148 | 5/1992 |
| WO | WO 92/17956 | 10/1992 |

OTHER PUBLICATIONS

Draft Recommendation GSM 04.08—"Mobile Radio Interface Layer 3 Specification," Version 1.0.0, Nov. 1987.

Draft Recommendation GSM 05.02—"European digital cellular telecommunications system (phase 1); Multiplexing and Multiple Access on the Radio Path," European Telecommunications Standards Institute, Feb. 1992.

Recommendation GSM 04.07—"Mobile Radio Interface Signalling Layer 3—General Aspects," v.3.3.2, Jan. 1990.

GSM 04.07 Version 3.3.3—"Mobile Radio Interface Signalling Layer 3—General Aspects," Technical Specification, European Telecommunications Standards Institute, Feb. 1992.

Recommendation GSM 04.08, v. 3.13.0, "European digital cellular telecommunications system (phase 1); Mobile radio interface layer 3 specification," Interim European Telecommunication Standard—$2^{nd}$ Final Draft, pr I-ETS 300 022, Feb. 1992.

Draft Status Report—Draft Recommendation GSM 04.08 v.1.0.0, Dec. 7-10, 1987.

GSM doc (87) 143—"Status Report of WP3," Dec. 10, 1987, pp. 1-6.

Exhibit A—Samsung Telecommunications America's First Supplemental Invalidity Contentions—Claim Chart—Mobitex Interface Specification (Mobitex) Against the Asserted Claim of the '406 Patent.

Exhibit B—Samsung Telecommunications America's First Supplemental Invalidity Contentions—Claim Chart—U.S. Patent No. 5,103,445 (Ostlund) Against the Asserted Claim of the '406 Patent.

Kong, I., Lindsey, L., "CableNet: A Local Area Network Reservation System," $24^{th}$ IEEE Computer Society International Conference, Feb. 22-25, 1982, pp. 182-186.

Mouly, Michel, et al., The GSM System for Mobile Communications, Cell & Sys., 1992, pp. 46-47, 66-67, 90-91, 94-97, 192-193, 196-197, 320-323, 354-355, 366-369, 372-379, 384-385, 388-391, 424-427.

Bertsekas, Dimitri, et al., "Data Networks," pp. 312-317 (Prentice-Hall, Inc., Upper Saddle River, New Jersey 07458, $2^{nd}$ ed. 1992).

Mouly, Michel, et al., The GSM System for Mobile Communications, Cell & Sys., 1992, pp. 45, 186-259, 272-278, 396-412.

ETSI STC SMG3/SMG4 (Telia Research): "GPRS—A Proposal Based on Packet Radio". SMG4, Tdoc 49, 1994.

*GPNE Corp.* v. *Time Warner Cable, Inc., Comcast Cable Communications LLC and Charter Communication Inc.*, U.S. District Court for Eastern District of Texas, 6:2007cv00060, Tyler, TX.

*GPNE Corp.* v. *Samsung Telecom American LP, LG Electronics, MobilecommUSA, Inc., HTC America, Inc.*, U.S. District Court for Easter District of Texas, 6:2007cv00059, Tyler, TX.

*Cisco Systems, Inc., Scientific Atlanta Inc., Arris Group Inc., Thomson, Inc.*, v. *GPNE Corp.*, District Court for District of Delaware, CA 07-671 (SLR).

* cited by examiner

PAGER RECEIVER PROGRAM FLOW CHART

CENTRAL OFFICE LAYOUT

PAGER

P$_1$ ALIGN ITS CLOCK WITH S$_2$ FROM C$_1$ (STEP 504)
P$_1$ DETECTED NEW SYSTEM INFORMATION ON C$_2$ (STEP 508)
P$_1$ REQUESTING NEW FREQUENCIES (STEP 510)
S$_2$ TELLS PAGER TO IDENTIFY ITSELF (STEP 616)
P$_1$ SENDS ITS ID INFORMATION ON C$_3$ (STEP 516)
NEW TIME SLOT AND NEW FREQUENCIES
INFORMATION GIVEN ON C$_2$ FROM S$_2$ (STEPS 632 AND 634)

CENTRAL STATION SWITCHING ENABLING

METHOD FOR NETWORK COMMUNICATION ALLOWING FOR PERSISTENT REQUEST SLOTS FOR NETWORK NODES AS WELL AS SEPARATE INDENTIFICATION INFORMATION TO BE SENT FROM NODES

CLAIM OF PRIORITY

This application is a continuation of U.S. patent application Ser. No. 11/668,922 filed on Jan. 30, 2007, which is a continuation of U.S. patent application Ser. No. 11/350,616 filed on Feb. 8, 2006, now U.S. Pat. No. 7,200,406, issued Apr. 3, 2007, which is a continuation of U.S. patent application Ser. No. 09/847,005 filed on May 2, 2001, now U.S. Pat. No. 7,031,716, issued Apr. 18, 2006, which is a continuation of U.S. patent application Ser. No. 09/594,662 filed on Jun. 15, 2000, now U.S. Pat. No. 6,282,406, issued Aug. 28, 2001, which is a continuation of U.S. patent application Ser. No. 09/259,417, filed on Dec. 9, 1997, now U.S. Pat. No. 6,108,520, issued Aug. 22, 2000, which is a continuation of U.S. patent application Ser. No. 08/608,629 filed on Feb. 29, 1996, now U.S. Pat. No. 5,729,827, issued Mar. 17, 1998, which is a divisional of U.S. patent application Ser. No. 08/264,973, filed Jun. 24, 1994, now U.S. Pat. No. 5,542,115, issued Jul. 30, 1996, entitled "PAGING METHOD AND APPARATUS," naming Wong, et al. as inventors, all of these applications being incorporated by reference herein in their entirety.

BACKGROUND

1. Technical Field

This invention pertains to communications paging, and particularly to two-way paging method and apparatus.

2. Related Art

Over the last several decades, pagers have proven to be important communication devices for contacting remotely situated personnel. Whereas primitive pagers provided primarily only a tonal and/or vibratory output, more modern pagers have enhanced output capabilities such as message-bearing alphanumeric displays.

Paging systems have historically been one-way systems. That is, the user receives a paging message from a central terminal but has no way of responding to that message with the pager. Prior art attempts to provide two-way communication capabilities for a pager have included efforts to connect the pager to a telephone (e.g., to a mobile radio telephone). See, for example, U.S. Pat. No. RE 33,417 to Bhagat, et al. (which combines an entire radio pager and radiotelephone linked through an automatic dialer) and U.S. Pat. No. 5,117,449 to Metroka, et. al. (which purports to combine paging and cellular radiotelephone functions in a single unit).

Some pagers have the capability of providing an acknowledgment or response to a paging signal. In some such "ack-back" systems, a user operates a reply input device (e.g., a toggle switch, pushbutton switch, or keyboard) when paged. Typically such ack-back systems involve a complex acknowledgement transmission scheme, involving numerous frequencies or frequency sub-bands. Hand-off of the pager, as the pager travels between differing geographic regions or "cells" served by differing central stations, becomes technically cumbersome when multitudinous frequencies are involved.

SUMMARY

A two-way paging system utilizes four local frequencies for transmissions between pager units and a central control station. A first local frequency carries a local clock; a second local frequency carries communications packets from the central control station to paging units; a third local frequency carries communication packets from the pager units to the central control station; and a fourth local frequency carries a status or request signal from the paging units to the central control station. Transmissions on the fourth local frequency are in accordance with a time divided slot allocation among pager units accessing the central control station.

For a two-way paging system having a plurality of central control stations servicing a corresponding plurality of cells, a total of eight frequencies are utilized within any one cell. Four of the utilized frequencies are the local frequencies (which may differ from cell to cell), and four of the utilized frequencies are lower power common frequencies or switching frequencies which are used to switch or hand-off a pager unit traveling from one cell to another.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

Figure 1:
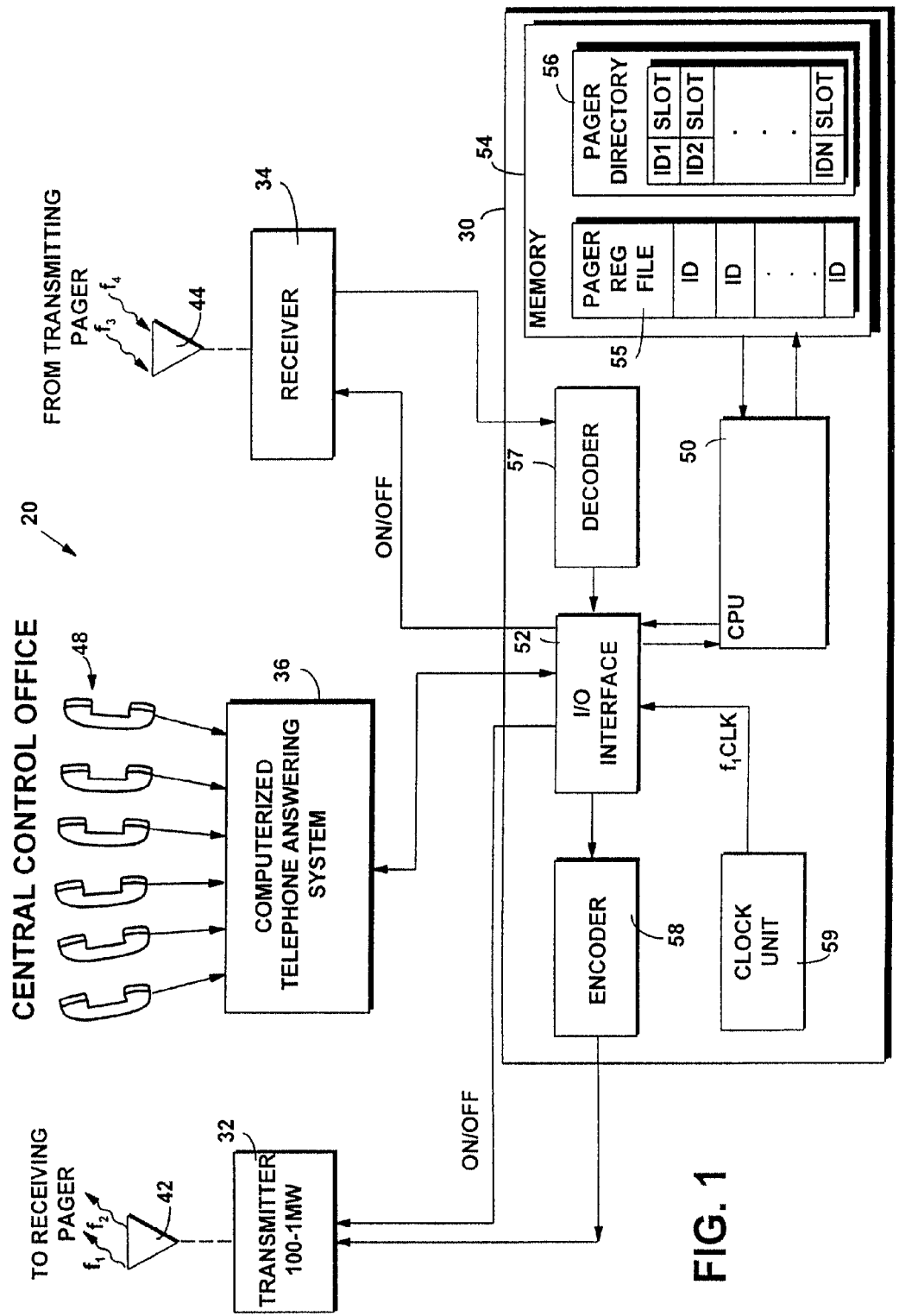
FIG. 1 is a schematic view of a central control station included in a paging system of an embodiment of the invention.
Figure 2:
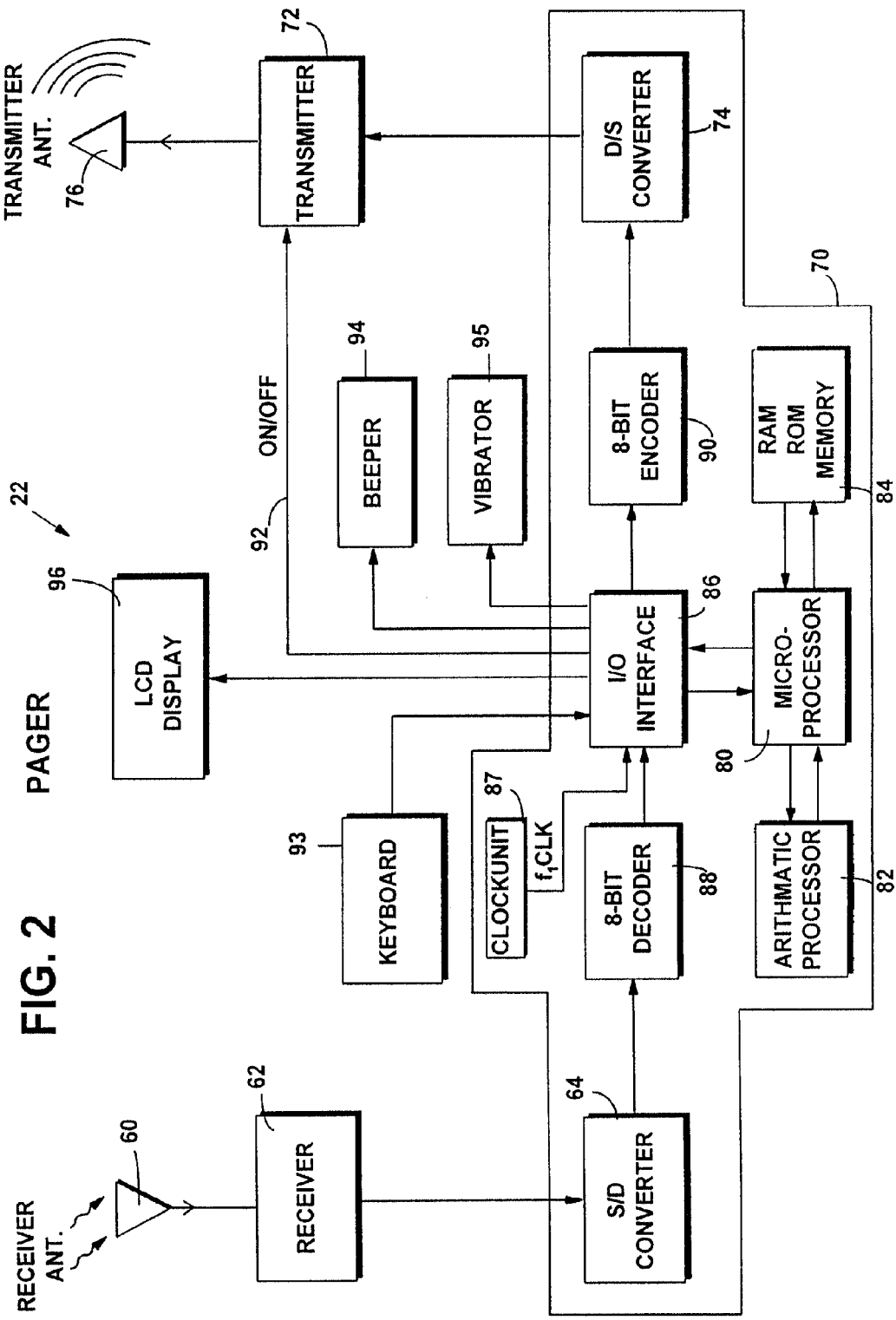
FIG. 2 is a schematic view of a pager unit included in a paging system for use with the central control station of FIG. 1.

FIG. 1 shows a central control station 20 according to a first embodiment of the invention; FIG. 2 shows a paging unit 22 suitable for use with central control station 20.

As shown in FIG. 1, central control station 20 includes central computer 30; transmitter 32; receiver 34; and computerized telephone answering system 36. Transmitter 32 transmits, via transmitting antenna 42, two local frequencies, namely frequency $f_1$ and frequency $f_2$. Receiver 34 is connected to receiver antenna 44 for reception of two local frequencies, namely frequency $f_3$ and frequency $f_4$. Computerized telephone answering system 36 is connected to a bank of telephones 48.

Central computer 30 of central control station 20 comprises a conventional computer equipped with typical components including a CPU 50; I/O interface 52; and memory 54. Although shown only generally in FIG. 1, it should be understood that memory 54 includes a number of unillustrated memory devices, including (for example) a hard disk drive, RAM, and ROM. FIG. 1 shows that memory 54 has stored therein (among other things) a pager registration file 55 and a pager directory file 56. Pager files 55 and 56 are typically stored on a hard disk drive of central computer 30, and upon start-up are loadable into a RAM portion of memory 54.

Central computer 30 of central control station 20 further includes a decoder 57 (connected between receiver 34 and I/O interface 52 for decoding in-coming communications information from one or more pager units 22), as well as encoder 58 (connected between I/O interface 52 and transmitter 32 for encoding out-going communications information).

Central control station 20 also includes a clock unit 59 which generates a local clock signal $f_1$clk (which, in turn, is used to modulate frequency $f_1$).

Figure 12:
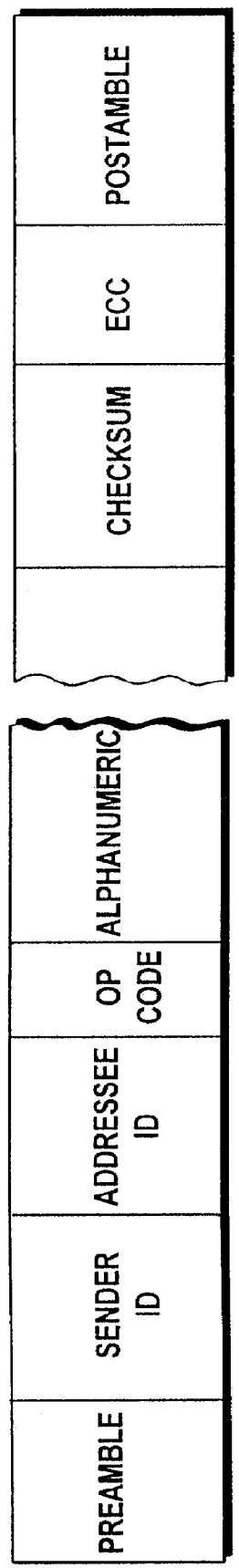
FIG. 12 is a schematic view of a format of a communications packet utilized with embodiments of the invention.

As illustrated further herein, CPU 50 of central control station 20 prepares communications packets for transmission on frequency $f_2$. As generally illustrated in FIG. 12, the communications packets are of a predetermined format, having fields for identification of the central control station, for identification of the addressed pager unit(s) 22, for an operation code, for (optionally) alphanumeric information, and for other conventional packet-type information such as checksum, error correction, and postamble. The preamble and postamble are specially chosen patterns which can be recognized and distinguished from data for the purpose of determining the beginning and ending of a packet. The alphanumeric information can be in a customary binary 8-bit format. The format of FIG. 12 is illustrative only, as such information as the order of the fields can be varied in other embodiments.

Central control station 20 communicates with a plurality of pager units $22_1$, $22_2$, ... $22_N$. Only one such pager unit, generically referenced as pager unit 22, is specifically illustrated and described herein, it being understood that the construction and operation of other pager units may be similar to the one illustrated.

As shown in FIG. 2, pager unit 22 includes a pager receiver antenna 60 which is connected to pager receiver 62. Pager receiver 62 is, in turn, connected through S/D converter 64 within pager computer 70. Receiver 62 receives the two local frequencies $f_1$, and $f_2$, which frequencies have been modulated to carry in-coming communications information (described in more detail below) to pager computer 70. On a communications output side, pager computer 70 outputs out-going communications information to pager transmitter 72 via D/S converter 74. Transmitter 72 broadcasts, on pager antenna 76, the out-going communications information on the two local frequencies $f_3$ and $f_4$.

As also shown in FIG. 2, pager computer 70 includes pager microprocessor 80 which is connected to each of an arithmetic processor; a memory system 84 (including both ROM and RAM); and I/O interface 86. I/O interface 86 is connected to a clock unit 87. I/O interface 86 is also connected to receive in-coming decoded communications information from an 8-bit decoder 88 and to output out-going uncoded communications information to an 8-bit encoder 90. Decoder 88 is connected to receive in-coming coded communications information from S/D converter 64; encoder 90 is connected to output out-going coded communications information to D/S converter 74.

Clock unit 87 is settable by suitable inputs thereto so that clock unit 87 generates a local clock signal $f_1$clk having a frequency corresponding to its input. It should be understood that, in other embodiments, the function of clock unit 87 can be performed at least partially by microprocessor 80 using programmed execution.

I/O interface 86 is also connected to supply an on/off signal on line 92 to pager transmitter 72, as well as to facilitate input and output with numerous input/output devices. The input/output devices connected to I/O interface 86 include keyboard 93; beeper 94; vibrator 95; and LCD (alphanumeric) display 96.

Upon manufacture, pager unit 22 is preprogrammed with an identification serial number (e.g., a 7-digit alphanumeric pre-assigned ID number) which is stored in memory 84 (ROM). Pager unit 22 is activated (e.g., at the time of purchase) by inserting a time slot assignment (explained below) both into a predetermined address in memory 84 of pager unit 22 and into pager directory file 56 (stored in memory 54 of central control station 20).

Operation of First Embodiment

Communication between central control station 20 and pager unit 22 occurs on the four local frequencies, in particular the frequencies $f_1$, $f_2$, $f_3$, and $f_4$ mentioned above. The first frequency ($f_1$) carries the local clock-aligning signal from central control station 20 to paging unit 22. The second frequency ($f_2$) carries a pager command and alphanumeric data from central control station 20 to paging unit 22. The third frequency ($f_3$) carries pager status data and alphanumeric data from paging unit 22 to central control station 20. The fourth frequency ($f_4$) carries a pager request signal from paging unit 22 to central control station 20. In the illustrated embodiment, the frequencies $f_1$-$f_4$ are preferably chosen so that $f_1 \neq f_2 \neq f_3 \neq f_4$.

Figure 13:
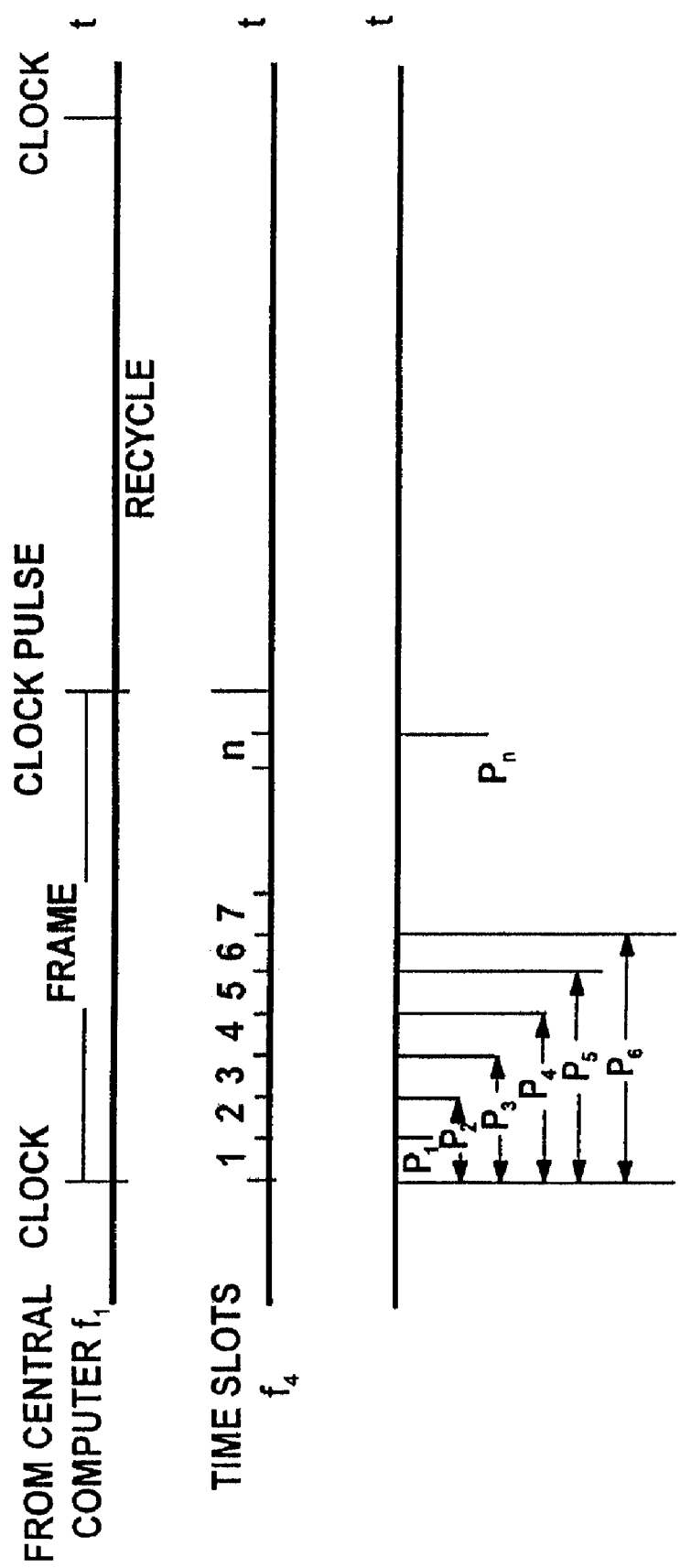
FIG. 13 is a schematic view illustrating a time divided slot allocation technique according to the invention.

As explained in more detail below and illustrated in FIG. 13, in normal non-cell-switching operation, the pager request signal on frequency $f_4$ is transmitted in a predetermined time slot assigned to paging unit 22. The predetermined time slot on frequency $f_4$ is related to the clock-aligning signal (carried by frequency $f_1$) and assigned whereby the fourth frequency is utilizable by a plurality of other paging units. For example, as shown in FIG. 13, a first time slot on frequency $f_4$ is assigned to a pager P1; a second time slot is assigned to pager P2, and so on up to time slot n assigned to pager Pn. In the illustrated embodiment, the number of time slots (and accordingly the number of pagers) may be as many as ten thousand or more.

Figure 3:
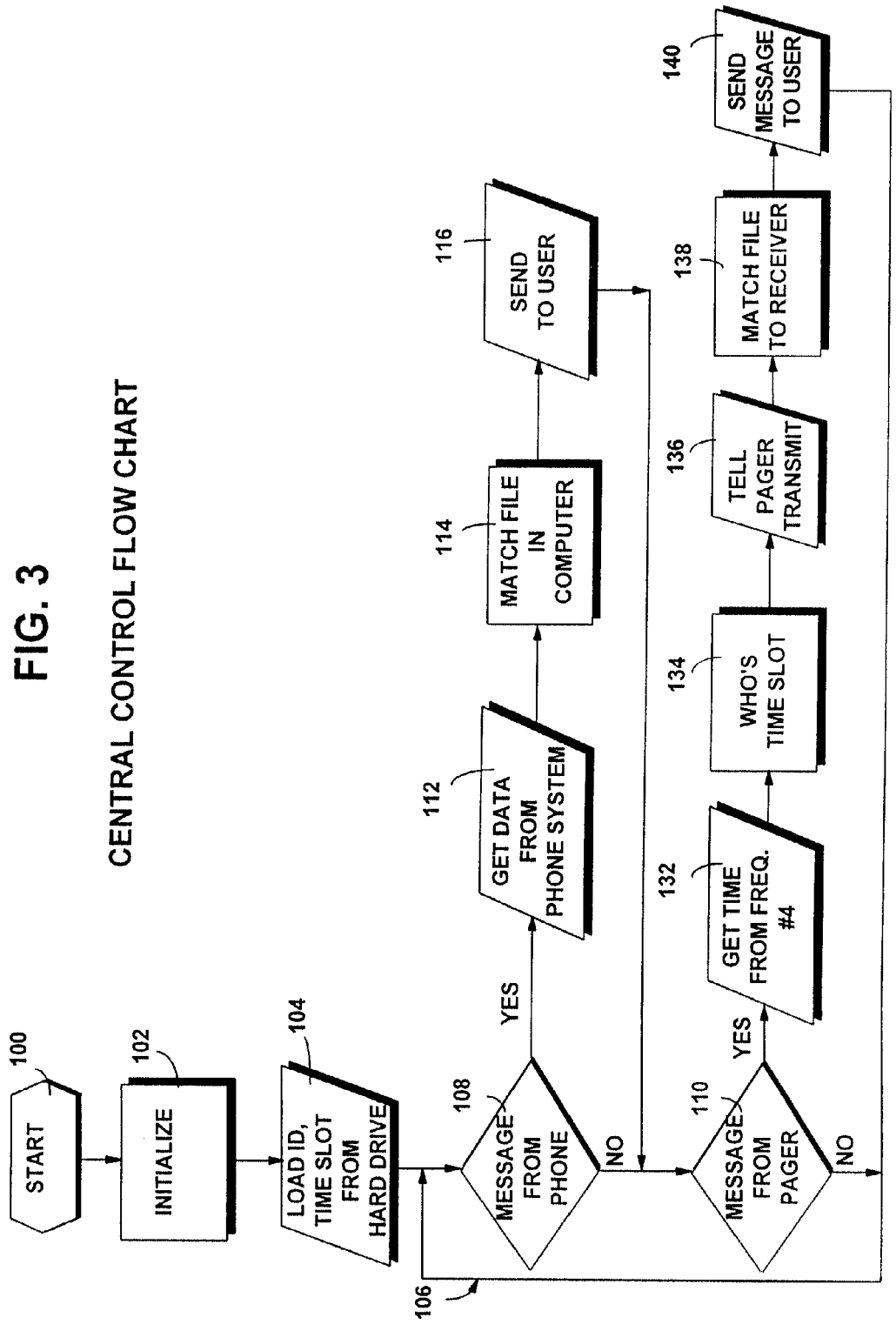
FIG. 3 is a flowchart depicting steps executed by the central control station of FIG. 1.

FIG. 3 shows steps executed by CPU 50 of central control station 20 in processing communications to and from one or more paging units. The steps depicted in FIG. 3 are indicative of instructions stored in a ROM portion of memory 54 of central control station 20.

When central control station 20 is started up (step 100), an initialization process (step 102) is conducted. Included in the initialization process is activation of transmitter 32 (so that transmitter 32 can transmit at the two frequencies $f_1$ and $f_2$) and activation of receiver 34 (so that receiver 34 can receive the two frequencies $f_3$ and $f_4$). Moreover, frequency $f_1$ is modulated to carry the local clock-aligning signal generated by local clock 59. Then, at step 104, the pager registration file 55 and the pager directory file 56 are loaded from hard disk into a RAM section of memory 54 (step 104).

After initialization and loading of the files 55 and 56, CPU 50 repetitively executes an instruction loop 106. Loop 106 involves checking to determine (at step 108) whether a telephone message is being received (via answering system 36 from one of the telephones in bank 48) and checking to determine (at step 110) whether a pager message is being received (via transmitter 32 from one of the pager units 22).

As used herein, a message, whether originated from a telephone or from a pager, may require a plurality of packets for transmission from a central station 20 to a pager 22 or vice versa. In the ensuing discussion, transmission and reception of messages subsumes transmission and reception of one or more packets. In general, the packetization of messages will be invisible to the user, meaning that a user enters a message without regard to the number of packets which might be required to transmit the message. The message typically ends with a user-entered message termination character or message delimiter character. The transmitting device (either central station 20 or pager 22), allocates the message to one or more packets having a format similar to that of FIG. 12, with the last packet in the message bearing the message termination character. Alternatively, the packets may be formatted in a manner to indicate the number of consecutively related packets emanating from a transmitter (e.g., there may be a separate packet field indicating the continuation number of related packets).

Central computer 30 can distinguish between receipt of a telephone message (at step 108) and a pager message (at step 110) by virtue of the fact that I/O interface 52 generates different types of interrupts to CPU 50 depending on the type of message received. If it is determined at step 108 that a telephone message is being received, steps 112, 114, and 116 of FIG. 3 are executed.

In processing a received telephone message, at step 112 central computer 30 extracts out-going communications information from the predeterminately sequenced telephone-entered data. The telephone-entered data, entered via a touchpad of a calling one of the telephones in bank 48, includes by convention an identification (e.g., telephone number) of the calling telephone; an identification of the called pager unit (e.g., the 7-digit alphanumeric pre-assigned ID number); and any character data for transmission followed by a termination character. This out-going communications information is received at central computer 30 in standard DTMF format.

At step 114, using the ID number of the called pager (obtained at step 112) central computer 30 checks the pager registration file 55 and directory file 56 to determine whether the called pager unit is registered with central control station 20. Assuming that the called pager is so registered, at step 114 the central computer 30 also obtains from pager directory file 56 the slot assignment for the called pager unit.

At step 116, central control station 30 transmits communications information to the called pager unit. In this regard, central control station 20 prepares and transmits (on frequency $f_2$) a communications message which includes, among other things, the ID of the called pager unit and the character data received from the telephone for transmission of the pager unit 22. After step 116 is executed, processing returns to loop 106.

If it is determined at step 110 that a pager message is being received, even numbered steps 132-140 of FIG. 3 are executed (prior to returning to loop 106). As will be seen hereinafter with respect to FIG. 4, a sending pager unit 22 transmits, in its assigned time slot, a request signal on frequency $f_4$ when the sending pager unit 22 desires to send a message. As central control station 20 is always monitoring frequency $f_4$, a request signal carried by frequency $f_4$ from any pager unit 22 is noted. With reference to the local clock 59, at step 132 CPU 50 determines in what time slot on frequency $f_4$ the request signal is detected. Upon detection of the time slot at step 132, at step 134 CPU 50 consults the pager directory file 56 to determine the identification number of the particular pager unit 22 which originated the request signal.

With the identity of the requesting pager unit 22 now known, at step 136 central control station 20 authorizes the requesting pager unit 22 to transmit its message. In particular, CPU 50 directs preparation of a communications message for transmission on frequency $f_2$. The particular communications packet prepared at step 136 includes an identification of the requesting pager unit (the addressee of the packet), as well as an operation code ("op" code) which commands/authorizes the requesting pager unit 22 to send its message.

At step 138, central control station 20 receives a communications message on frequency $f_3$ sent from the sending (e.g., requesting) pager unit 22. The communications message prepared and sent by the sending pager unit 22 includes packets of similar format to that shown in FIG. 12, and includes an identification of a pager to which the message is ultimately addressed as well as its own identification. At step 138, CPU 50 checks to ensure that the ultimate addressee pager unit is registered in pager files 55 and 56. At step 140, CPU 50 makes any necessary reformatting and/or information substitution in the message, and causes the message to be transmitted on frequency $f_2$. The transmission on frequency $f_2$ required by step 140 includes the identification of the ultimate addressee (e.g., a pager unit 22) as well as an operation code indicating that the transmission includes a relayed message from another pager unit.

Figure 4:
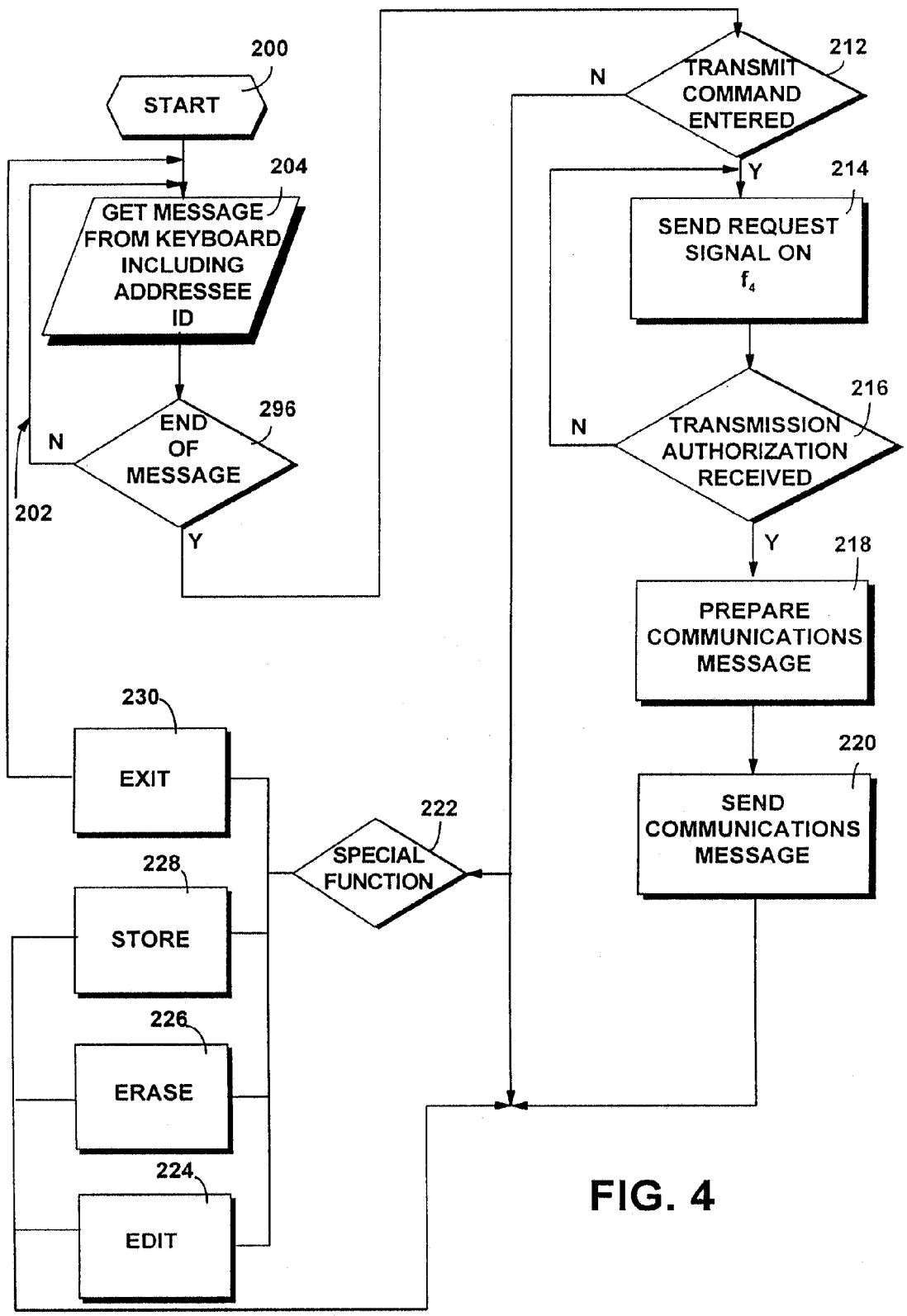
FIG. 4 is a flowchart depicting steps executed by the pager unit of FIG. 2 when in a transmit mode.
Figure 5:
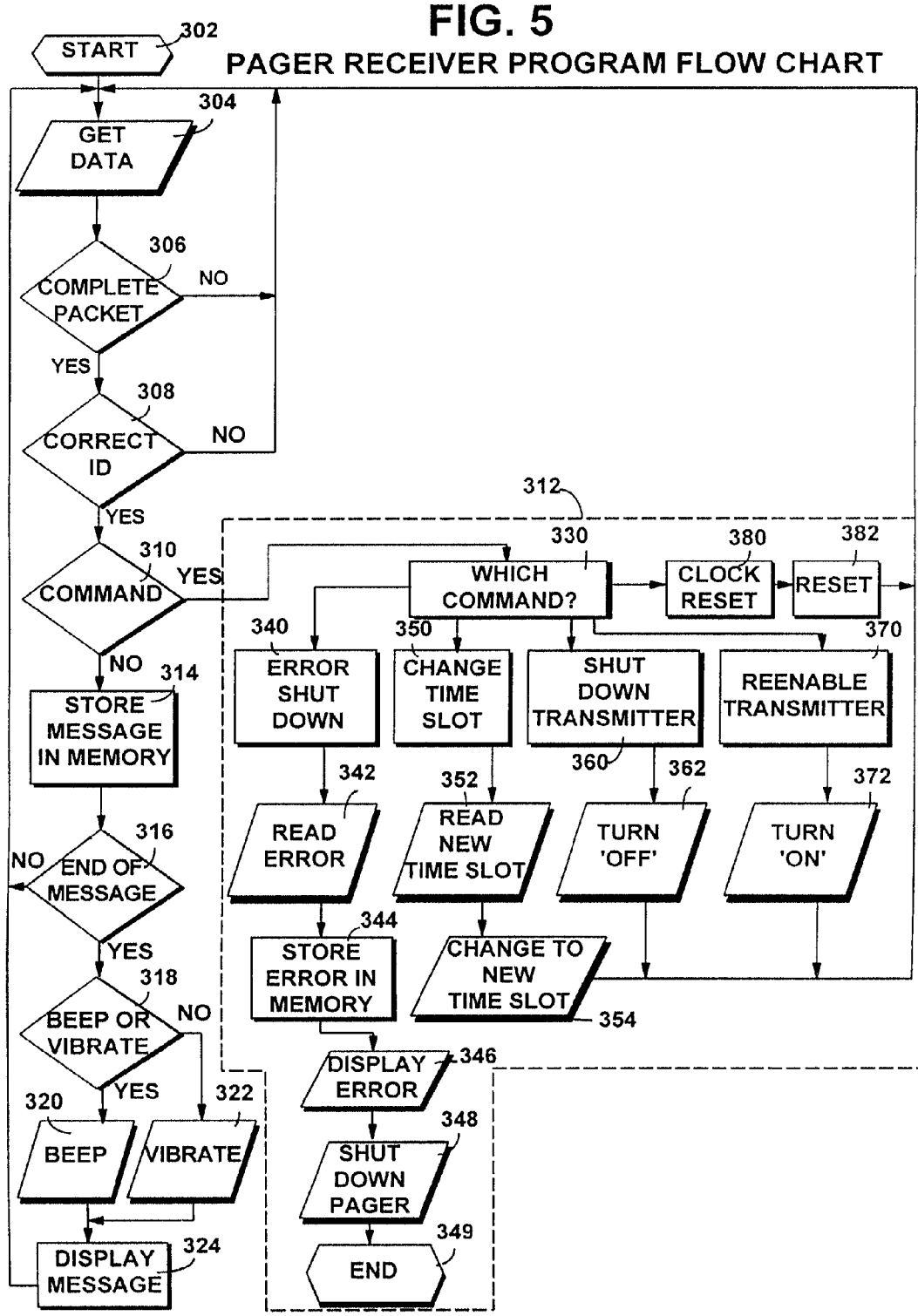
FIG. 5 is a flowchart depicting steps executed by the pager unit of FIG. 2 when in a receive mode.

Steps executed by a pager unit 22 in connection with its transmission mode are depicted in FIG. 4. Steps executed by a pager unit 22 in connection with its receive mode are depicted in FIG. 5. The term "mode" as used herein does not connote exclusivity at any particular moment, for it should be remembered that at all times pager unit 22 is receiving transmissions on frequencies $f_1$ and $f_2$.

In its transmission mode (see FIG. 4), after start-up (step 200) microprocessor 80 of the transmitting pager unit 22 executes a loop 202 wherein user alphanumeric characters (entered via keyboard 93) are repetitively fetched (at step 204) until an end of message delimiter is detected (at step 206). As entered, the characters fetched at step 204 are displayed on LCD display 96. Entry of the delimiter character at step 206 causes microprocessor 80 to exit loop 202. By convention, the message must include an addressee ID, which addressee ID is likely the ID of another one of the pager units to which the message entered in step 204 is directed.

After entry of the message awaits entry from keyboard 93 of a transmit command at step 212. Assuming that the transmit command is entered at step 212, microprocessor 80 prepares and sends a request signal on frequency $f_4$. As indicated before, the request signal is transmitted on frequency $f_4$ in a time slot assigned to the requesting pager unit 22. It should be kept in mind that pager unit 22 is all the while receiving the local clock-aligning signal on frequency $f_1$, which enables microprocessor 80 to cause transmission of the request signal on frequency $f_4$ at a time corresponding to the specific time slot allotted to the particular sending pager unit 22.

In the above regard, in accordance with time division techniques, each pager unit $22_1$-$22_N$ (e.g., pagers $P_1$-$P_N$ in FIG. 13) is assigned a selected one of N number of time slots on frequency $f_4$.

After transmission of the request signal at step 214, pager unit 22 awaits receipt of a transmit command from central control station 20. Preparation and transmission of the transmit command/authorization from central control station 20 is described with reference to FIG. 3. Upon receipt of the transmit command/authorization from central control station 20 (step 216), microprocessor 80 prepares (at step 218) a communications message with one or more packets having a format much like that of FIG. 12. The addressee ID and alphanumeric field of packets of the communications message is filled with the message entered in loop 202. At step 220, the sending pager unit 22 broadcasts the communications packet on frequency $f_3$.

If a transmit command is not entered at step 212, or after transmission of the message at step 220, microprocessor 80 awaits entry of at least one of several possible special function keys at step 222. For example, the user may press a function key which requires storage of the message (whether yet transmitted or not) [see step 228]. Alternatively, the user may press function keys which facilitate editing or erasure of the message (see steps 224 and 226, respectively). To complete the message and begin work on another message, a special function key for an exit operation (step 230) must be pressed.

FIG. 5 depicts steps executed by microprocessor 80 of pager unit 22 when in a receive mode. After start-up (step 302), and as indicated by step 304, pager unit 22 receives transmissions from central control station 20 on frequency $f_2$. Once a complete packet is received (determined at step 306), a check is made (at step 308) whether the addressee ID in the communications packet (see packet format of FIG. 12) is the ID of the receiving pager unit 22. If the determinations of either step 306 or 308 are negative, pager unit 22 awaits either completion of the communications packet (in the case of step 306) or receipt of another communications packet (in the case of step 308) by looping back to step 304.

Assuming that the received communications packet is designated for this particular receiving pager unit 22, at step 310 microprocessor 80 consults the operation code field of the communications packet (see FIG. 12) to determine if the operation code indicates that the message includes a command. If the operation code indicates a command, a command processing routine (framed by broken lines 312 in FIG. 5) is executed.

Assuming for the moment that the operation code does not indicate a command, at step 314 microprocessor 80 of pager unit 22 stores the alphanumeric field portion of the communications packet (which at least partially forms the message) in a RAM portion of memory 84. Since a message communicated from central processing station 20 may require several communications packets for completion of the message (with subsequent communication packets providing continuations of the message content), microprocessor 80 checks at step 316 to ensure that the entire message has been received. If not, processing continues back at step 304 for reception of a further communications packet.

Upon reception of an entire communications message, at step 318 microprocessor 80 determines whether pager unit 22 is in a beep mode or a vibrate mode. In this regard, there are numerous ways of setting paging unit 22 to the desired mode, either by a specially dedicated switch on paging unit 22 or by data entry using keyboard 93. If pager unit 22 is in a beep mode, microprocessor 80 outputs a signal which causes I/O interface 86 to issue a further signal to activate beeper 94 (step 320). Alternatively, if pager unit 22 is in a vibrate mode, microprocessor 80 outputs a signal which causes I/O interface 86 to issue a further signal to activate vibrator 95 (step 322).

At step 324, microprocessor 80 directs I/O interface 86 to send the alphanumeric message data to LCD display 96, so that the received message can be viewed by the user.

After notification to the user (either via beeper 94 and/or vibrator 95), and display (on LCD 96) of the received alphanumeric data, microprocessor 80 returns to step 304 to check whether further communications packets are being received.

The command processing routine (framed by broken lines 312 in FIG. 5) first determines (step 330) which particular operation is being commanded. This determination is based on the content of the operation code, which is different for different command types. If the operation code indicates an error shut-down, execution jumps to an error shut-down sub-routine which begins at step 340. If the operation code indicates a time slot change, execution jumps to a change time slot sub-routine which begins at step 350. If the operation code requires transmitter shut-down, execution jumps to a transmitter shut-down sub-routine which begins at step 360. If the operation code requires transmitter re-enablement, execution jumps to a transmitter reenable sub-routine which begins at step 370. If the operation code requires clock re-set, execution jumps to a clock re-set sub routine which begins at step 380.

In connection with the error shut down sub-routine, at step 342 microprocessor 80 obtains an indication of error type from the communications packet. The error type is stored in memory 84 (step 344) and then displayed on LCD display 96 (step 346). Then microprocessor 80 issues a command (at step 348) to shut down pager unit 22, which shut-down occurs at step 349.

In connection with the time slot changing sub-routine, at step 352 microprocessor 80 extracts, from the received communications packet, information indicative of the new time slot assigned to the receiving pager unit 22. The new time slot is entered (at step 354) into memory 84 and thereafter utilized (until further change) in connection with transmission of request signals on frequency $f_4$ (see, for example, step 214 of FIG. 4).

The time slot changing sub-routine may also include other operations, if desired, including (for example) eliminating unused time slots (thereby increasing scanning rate); diagnosing and trouble shooting; and avoiding interruption of service from malfunctioning or ill-functioning equipment.

In connection with the transmitter shut down sub-routine, at step 362 microprocessor 80 directs I/O interface 86 to issue an OFF command to transmitter 72. In connection with the transmitter re-enable sub-routine, at step 372 microprocessor 80 directs I/O interface 86 to issue an ON command to transmitter 72.

In connection with the clock re-set sub-routine, at step 382 microprocessor 80 directs that clock 59 of pager unit 22 be set.

After execution of steps 354, 362, 372, or 382, execution continues back to step 304 for processing of potential further communications packets. Thus, unless an error shut-down is noted, each entry of the command processing routine (framed by broken lines 312 in FIG. 5) is followed by a loop back to step 304.

Figure 6:
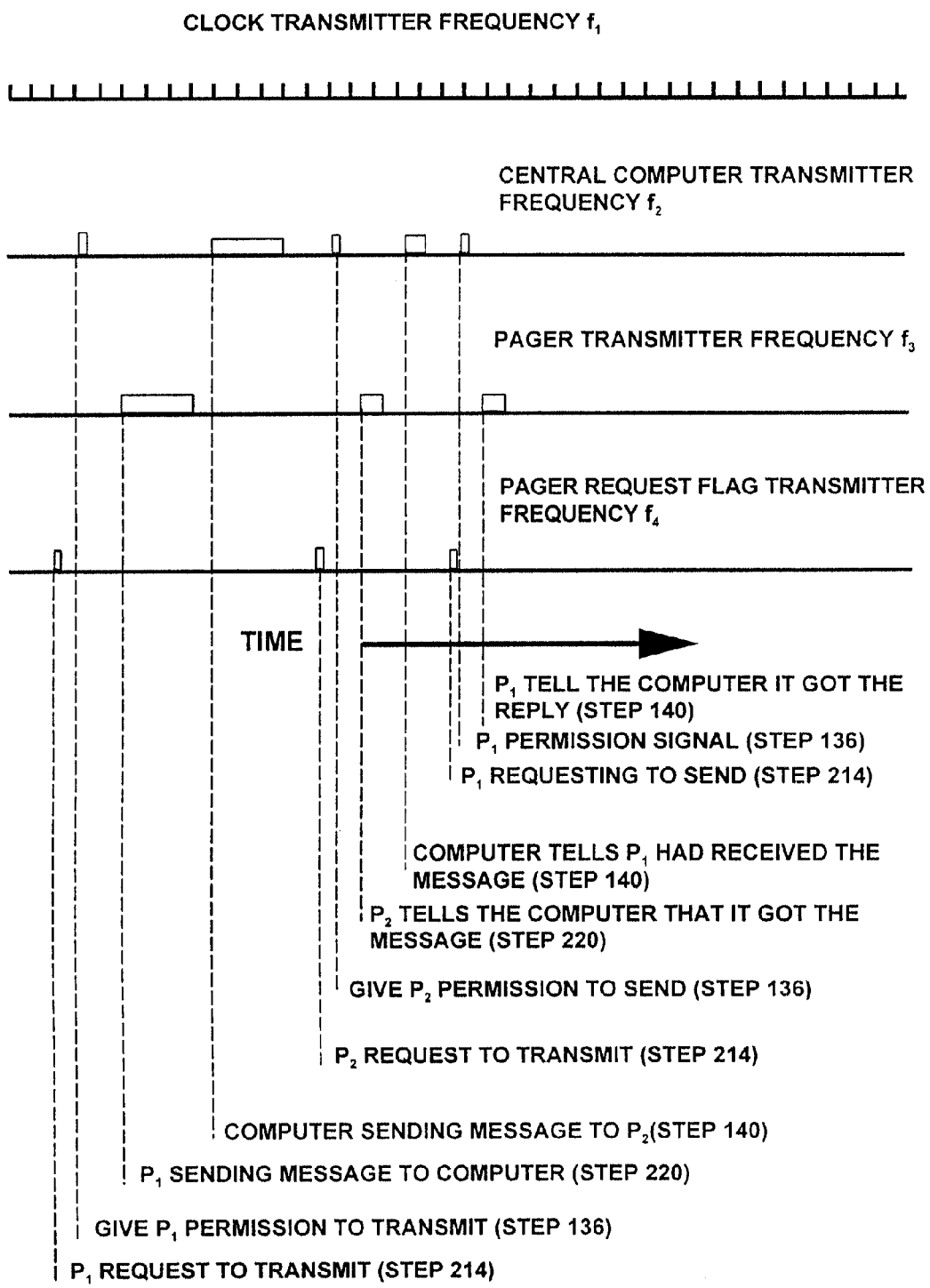
FIG. 6 is a timing diagram reflecting communications between the central control station of FIG. 1 and the pager unit of FIG. 2.

FIG. 6 is a timing diagram showing the frequencies $f_1$-$f_4$ and integration of the steps depicted in FIGS. 3-5, particularly in the context of a request by a sending pager unit P1 for sending a message to a sendee pager unit P2. As employed in FIG. 6, "computer" refers to central control station 20. It should be understood that the sending pager unit P1 and the sendee pager unit P2 operate in both the transmission mode as depicted in FIG. 4 and in the receiver mode as depicted in FIG. 5. In general, FIG. 6 shows transmission of a message from pager unit P1 (via central control station 20) to pager unit P2; transmission of a confirmation message from pager unit P2 (via central control station 20) to pager unit P1; and transmission of a message from pager unit P1 to central control station 20 indicating that pager unit P1 received the confirmation message from pager unit P2.

Structure of Second Embodiment

Figure 7:
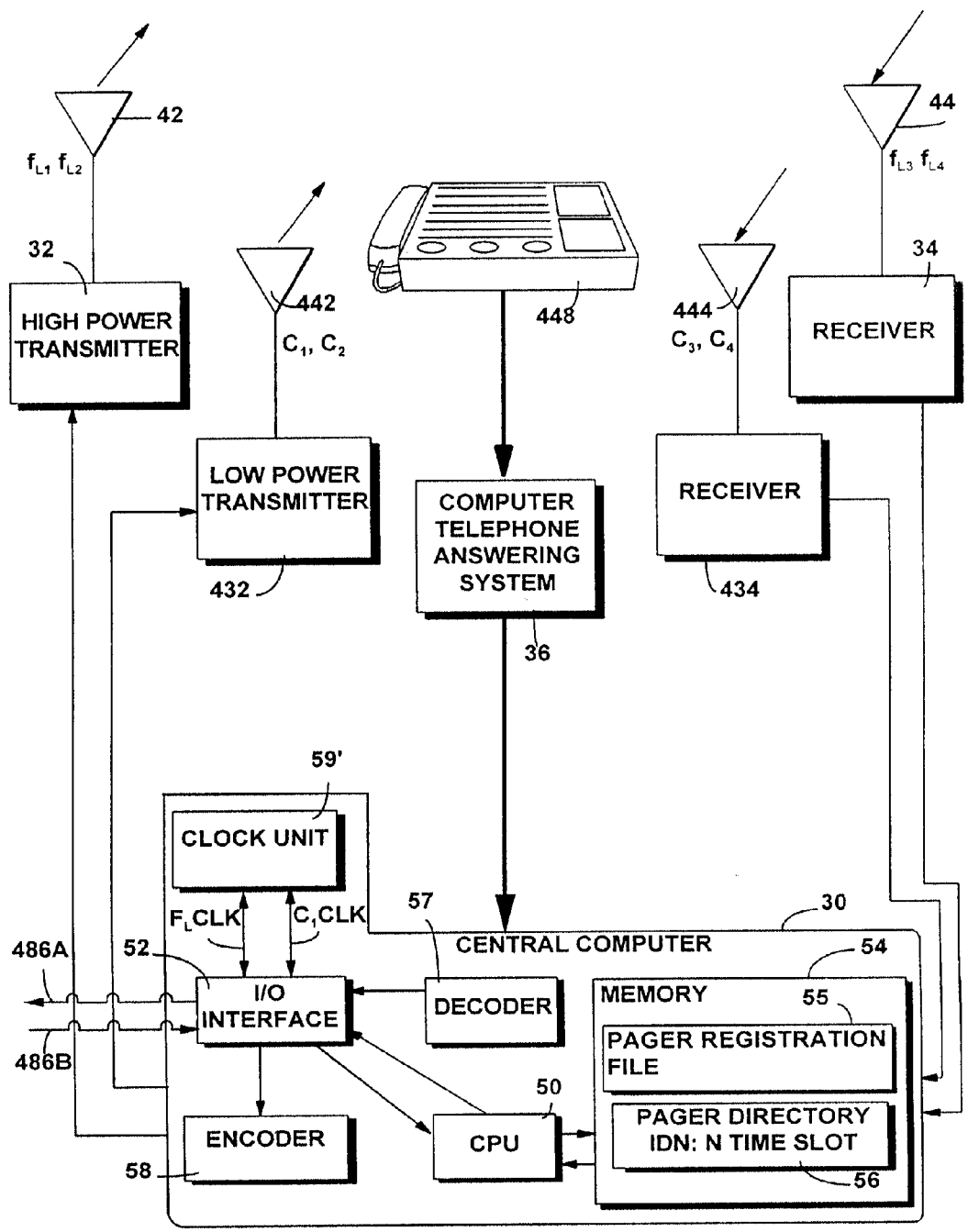
FIG. 7 is a schematic view of a central control station included in a paging system of a second embodiment of the invention.
Figure 8:
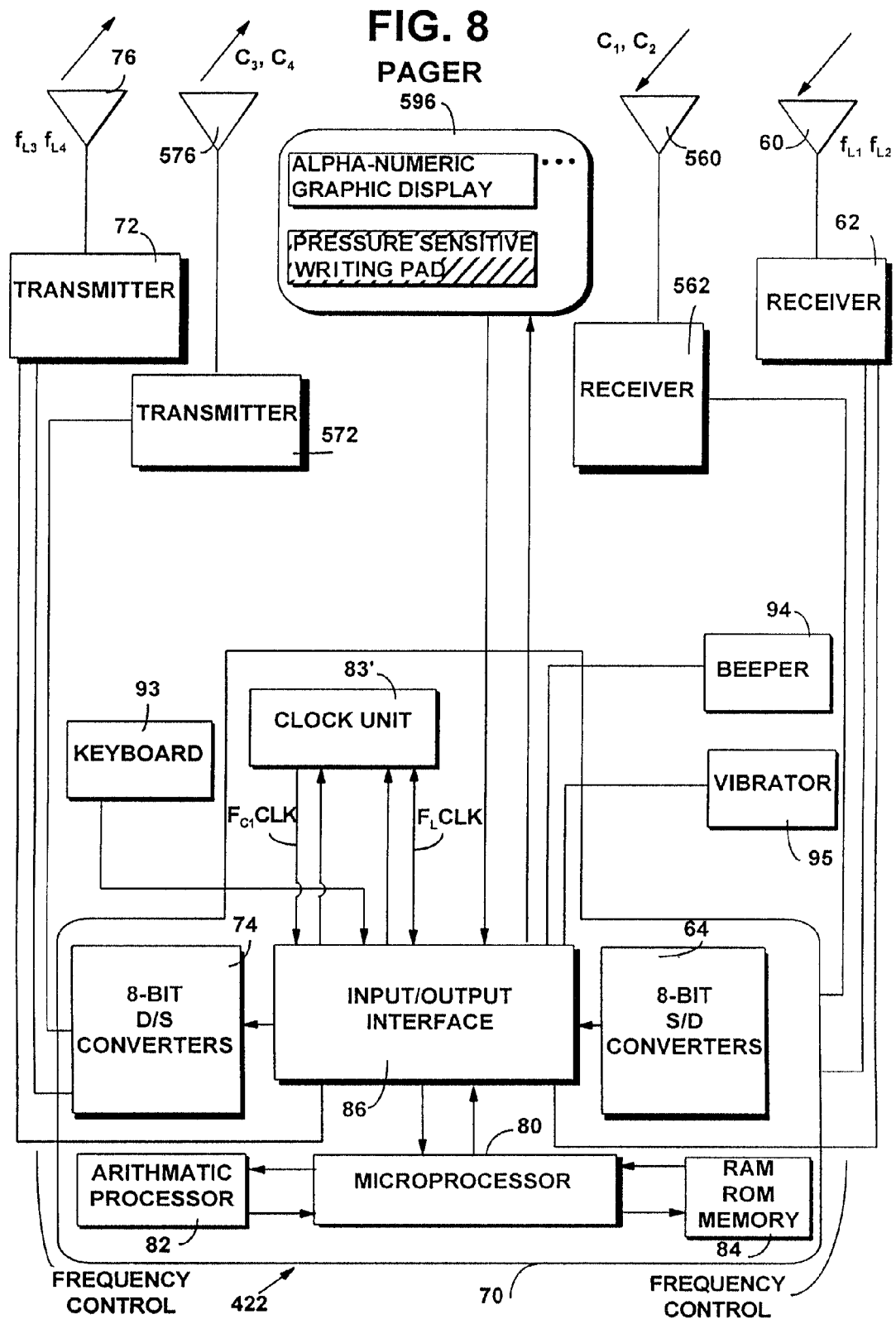
FIG. 8 is a schematic view of a pager unit included in a paging system for use with the central control station of FIG. 7.

FIG. 7 shows a central control station 420 according to a second embodiment of the invention; FIG. 8 shows a paging unit 422 suitable for use with central control station 420.

Figure 9:
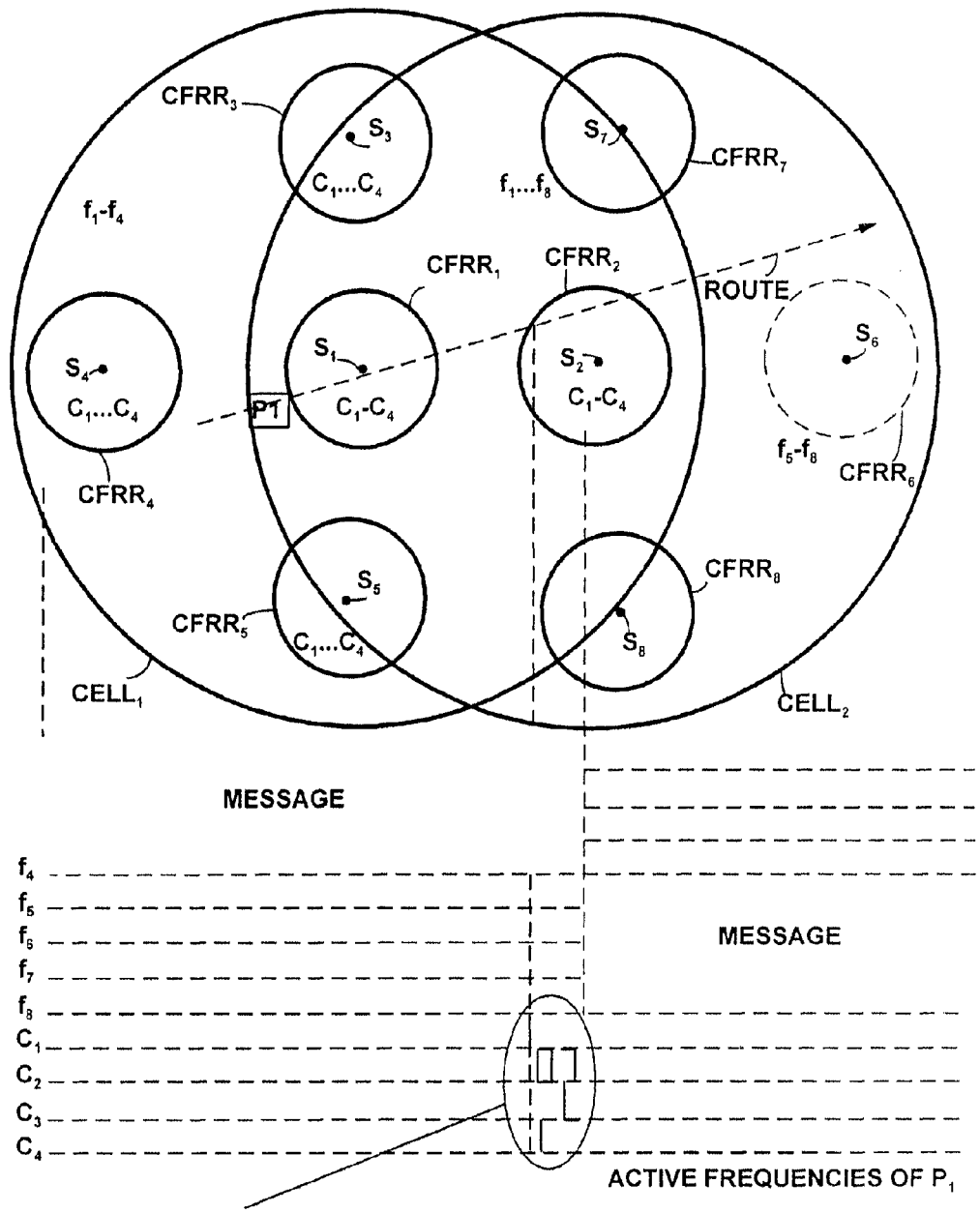
FIG. 9 is a hybrid schematic view and timing diagram for representing switching operations for the paging system of the second embodiment of the invention.

FIG. 9 shows a wide area paging system including a plurality of central control stations S1-S8 (each identical to central control station 420), each preferably geographically centered within a respective cell. Each central control station S1-S8 broadcasts its own local frequencies, as well as a set of common or switching frequencies $C_1$-$C_4$. The common frequencies $C_1$-$C_4$ are broadcast at a lower power, so that reception thereof occurs only in a relatively small neighborhood or common frequency reception region (CFRR) [also referred to as a "switching region"] about the central control station. The local frequencies are broadcast at a significantly greater power for reception substantially throughout the cell. For example, in FIG. 9, central control station S1 broadcasts its lower power common frequencies $C_1$-$C_4$ to $CFRR_1$ and its higher power local frequencies $f_1$-$f_4$ to $CELL_1$; central control station S2 broadcasts its lower power common frequencies $C_1$-$C_4$ to $CFRR_2$ and its higher power local frequencies $f_5$-$f_8$ to $CELL_2$.

As also shown in FIG. 9, $CELL_1$ and $CELL_2$ overlap in an overlap region shown in FIG. 9. Station S1 utilizes a set of local frequencies $f_1$-$f_4$; station S2 utilizes a different set of local frequencies $f_5$-$f_8$. Both stations S1 and S2 utilize the same set of common or switching frequencies $C_1$-$C_4$. Thus, each central control station utilizes two sets of frequencies, there being four frequencies in each set, resulting in a total of eight frequencies handled per station.

Thus, the second embodiment of the invention is suitable for a system having a plurality of central control stations $420_x$ where x=1, 2, ... M. Each central control station $420_x$ transmits and receives a set of local frequencies $f_{L1}$, $f_{L2}$, $f_{L3}$, $f_{L4}$ in an associated geographical area or cell, as well as the set of common or switch frequencies $C_1$, $C_2$, $C_3$, $C_4$. While the values of the local frequencies $f_{L1}$, $f_{L2}$, $f_{L3}$, $f_{L4}$ vary from cell to cell (e.g., differ for differing central control stations $420_x$), the values of the common or switch frequencies $C_1$, $C_2$, $C_3$, $C_4$ are uniform through the system (e.g., for all central control stations $420_x$).

Although not shown in FIG. 9, it should be understood that the pattern of central control stations repeats in like manner in all compass directions in accordance with the prescribed geographical boundaries of the paging system. Moreover, although not specifically illustrated in FIG. 9, it should also be understood that each central control station 420 has an associated CFRR.

The common or switching frequencies $C_1$-$C_4$ have an analogous function to the corresponding local frequencies $f_1$-$f_4$, respectively. In this regard, frequency $C_1$ carries a clock frequency transmitted by central control station(s), although the clock rate on common frequency $C_1$ preferably varies among central control stations. Frequency $C_2$ is used to transmit information from central control station(s) to pager unit(s); frequency $C_3$ is used to transmit information from a pager unit to a central control station; frequency $C_4$ is used by pager units to issue a request signal. Frequency $C_2$ carries packets having a format similar to that of FIG. 12. In analogous manner to frequency $f_2$, the packets carried by frequency $C_2$ may have command codes. Among the $C_2$ command codes are a SYSTEM COMMAND CODE; a LOCAL FREQUENCY DOWNLOAD COMMAND CODE; a SLOT RECOGNITION COMMAND CODE; and a SLOT ASSIGNMENT COMMAND CODE.

As shown in FIG. 7, central control station 420 resembles central control station 20 of the embodiment of FIG. 1 (similar components being assigned the same reference numerals for simplicity). However, central control station 420 is augmented by inclusion of a further transmitter, known as common frequency transmitter 432, together with its common frequency transmission antenna 442, for transmitting the common frequencies $C_1$ and $C_2$. In contrast to the high power transmitter 32, transmitter 432 is a low power transmitter. Further, central control station 420 is augmented by inclusion of a further receiver, known as the common frequency receiver 434, together with its common frequency receiver antenna 444, for reception of the common frequencies $C_3$ and $C_4$.

Central control station 420 of FIG. 7 includes a clock unit 59' which generates two clocking signals—a first or local clocking signal $f_L$clk and a second or common clocking signal $C_1$clk. The local clocking signal $f_L$clk is used to modulate frequency $f_1$; the common clocking signal is used to modulate the common frequency $C_1$.

The central computers 30 of the central control stations $420_x$ are serially connected to one another by an output line 486A and an input line 486B. In particular, although not expressly shown as such in FIG. 7, computer 30 of FIG. 7 (like that of FIG. 1) includes an I/O interface to which the serial lines 486A and 486B are connected. Serial lines 486A and 486B are used, for example, to update contents of the pager registration file 55 and the pager directory file 56.

As shown in FIG. 8, pager unit 422 resembles pager unit 22 of the embodiment of FIG. 2 (similar components again being assigned the same reference numerals for simplicity). However, pager unit 422 (in like manner as central control station 420) is augmented by inclusion of a further transmitter, known as common frequency transmitter 572, together with its common frequency transmission antenna 576, for transmitting the common frequencies $C_3$ and $C_4$. Further, central control station 420 is augmented by inclusion of a further receiver, known as the common frequency receiver 434, together with its common frequency receiver antenna 444, for reception of the common frequencies $C_1$ and $C_2$.

The operational frequencies of transmitter 72 and receiver 62 are changeable in accordance with values transmitted on "frequency control" lines from computer 70. In particular, the frequency control lines are connected to I/O interface 86 in computer 70. As described in more detail below, when a pager unit 422 migrates into a new CFRR, signals are applied on the frequency control lines in order to switch pager unit 422 from the local frequencies of an old cell to the local frequencies of a new cell associated with the new CFRR into which pager unit 422 migrates.

Pager 422 includes a clock unit 83' which is capable of separately generating local clocking signals $f_L$clk and the common clocking signals $f_{c1}$clk for use by microprocessor 80. These clocking signals are initiated and their frequencies set by appropriate respective inputs to clock unit 83'.

FIG. 8 also shows that pager unit 422 has data I/O unit 596 which includes both an alphanumeric graphic display and a pressure sensitive writing pad. The alphanumeric graphic display is a dot matrix device which can display characters and graphics. The writing pad has a 16×48 dot area.

Operation of Second Embodiment

As shown in FIG. 9, a pager unit P1 is assumed to have been operating in $CELL_1$ and to have previously received the common frequencies $C_1$-$C_4$ and local frequencies $f_1$-$f_2$ from station S1. Now pager unit P1 travels on a route indicated by broken arrow-headed line ROUTE. In traveling along the ROUTE, pager unit P1 continues to operate on local frequencies $f_1$-$f_2$, even as it travels through the cellular overlap region. However, when pager unit P1 enters a new common frequency reception region (i.e., $CFRR_2$), a switching or hand-off operation occurs. In the switching operation, as explained in more detail below, pager unit P1 obtains common frequencies $C_1$-$C_4$ from central control station S2 and, as a result, can switch from the local frequencies $f_1$-$f_4$ of $CELL_1$ to the local frequencies $f_5$-$f_8$ of $CELL_2$. In order to effect the switching or hand-off operation, pager unit P1 executes a channel switching routine; the central control station S2 executes a switching enabling routine.

In connection with the channel switching routine and the switching enabling routine, when pager unit P1 moves into $CFRR_2$, pager unit P1 will receive the clocking signal on frequency $C_1$ from station S2. At such point, pager unit P1 will automatically align its clock unit with the clocking signal from station S2.

Referring now to the channel switching routine executed by pager P1 subsequent to start-up (step 500), at step 506 pager unit P1 obtains information characterizing the system centered about station S2. Such characterizing information is referred to as system identification or system ID information.

At step 508, microprocessor 80 of pager unit P1 checks to determine if there is any new system ID information acquired on frequency $C_2$. That is, microprocessor 80 checks to determine if system ID information is received on frequency $C_2$ (which can occur only in a CFRR) and, if so, compares the system ID information to the immediately previously-stored system ID information. If the previous and most recently-acquired system IDs are the same, pager unit P1 realizes that it is still in the jurisdiction of the same station (e.g., station S1). If not, pager unit P1 realizes that it has now wandered into a CFRR of a new station (e.g., station S2) and, at step 510, initiates a request on frequency $C_4$ for communication with the central control station (e.g., station S2) for $CELL_2$.

In the above regard, since pager unit P1 has not yet been assigned a time slot for $CELL_2$, the request on frequency $C_4$ is randomly made. However, pager unit P1 keeps track of the time slot in which it makes its request to the new central control station (e.g., station S2).

Thereafter, pager unit P1 continues to monitor (step 512) communications packets from station S2 on frequency $C_2$, waiting for station S2 to issue a message which references the time slot at which pager unit P1 made its request of step 510. In particular, pager unit P1 awaits a message from station S2 on frequency $C_2$ that includes both a SLOT RECOGNITION COMMAND CODE and information stored in the same time slot which pager unit P1 randomly generated. Since the message including the SLOT RECOGNITION COMMAND CODE includes station S2 as the sender and mirrors the slot randomly generated by pager unit P1, pager unit P1 recognizes the message as being addressed to pager unit P1 and considers issuance of such a message by station S2 (see step 612 of FIG. 11) to constitute authority for pager unit P1 to communicate further with station S2. In this regard, at step 514 microprocessor 80 of pager unit P1 determines if there is a match between the time slot of a received message and the time slot at which the random request was made at step 510.

Assuming a match is eventually found at step 514, at step 516 pager unit P1 sends a communications packet on frequency $C_3$ to station S2, with the communications packet including the identification or ID of pager unit P1. Using pager registration file 55, station S2 verifies that the ID of pager unit P1 is a valid ID, and thereafter sends (on frequency $C_2$) to pager unit P1 a message with the command code LOCAL FREQUENCY DOWNLOAD, which message informs pager unit P1 of the values of the local frequencies handled by station S2 (e.g., frequencies $f_5$-$f_8$). Thereafter, as also reflected by step 518, station S2 sends (on frequency $C_2$) to pager unit P1 a message with the command code SLOT ASSIGNMENT COMMAND CODE, which message informs pager unit P1 of its slot assignment on frequency $f_8$. Microprocessor 80 then changes its slot allocation by steps which are similar to those discussed with the afore-mentioned change time slot routine (see steps 350, 352, and 354 of FIG. 5). Step 518 of FIG. 10 reflects reception of the local frequency values and reception of the slot assignment.

After acquisition of all local frequencies and the slot assignment is completed (step 520), microprocessor 80 implements (at step 522) a switch to the new local frequencies (e.g., frequencies $f_5$-$f_8$). In this regard, microprocessor 80 instructs I/O interface 86 to change transmitter 72 from frequencies $f_3$, $f_4$ to frequencies $f_7$, $f_8$; and to change receiver 62 from frequencies $f_1$, $f_2$ to frequencies $f_5$, $f_6$. I/O interface 86 accomplishes the frequency changes by applying appropriate values on the frequency control lines connecting the I/O interface to transmitter 72 and receiver 62, respectively.

After the switch to new local frequencies at step 522, microprocessor 80 loops back to step 506, ultimately to determine when any further switching may be required.

Figure 11:
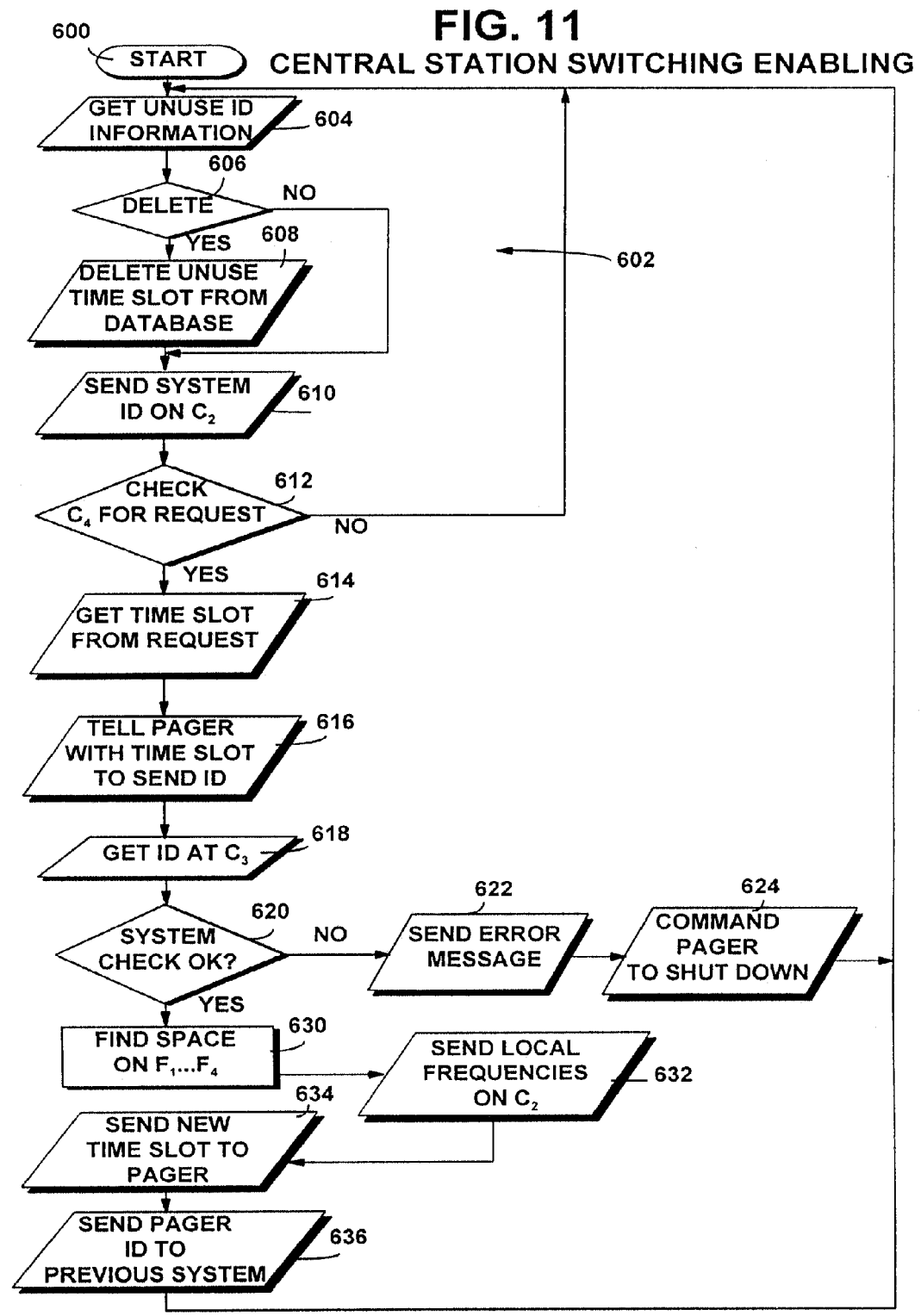
FIG. 11 is a flowchart depicting steps executed by the central control station of FIG. 7 in connection with a channel switching operation.

Steps involved in the switching enabling routine executed by a central control station (e.g., station S2) are depicted in FIG. 11. After start-up (step 600), CPU 50 executes a loop 602 which enables CPU 50 to clean up its pager directory file 56 and to check if any new pager units have wandered into the cell which it administers.

In particular, at step 604 CPU determines whether its central control station (e.g., S2) has been advised by any other central control station (e.g., S3) that a pager unit, formerly under the control of its central control station (e.g., S2), has come under the control of the other central control station (e.g, S3). Such advisement occurs on the serial links connecting the central control stations $420_x$, and particularly input serial link 486B. If such advisement occurs, the ID for the wandered-away pager is deleted from the pager directory file 56 for station S2 (as reflected by steps 606 and 608).

At step 610, CPU 50 causes messages with a SYSTEM COMMAND CODE to be transmitted on frequency $C_2$. As indicated before, messages transmitted on frequency $C_2$ include a packet(s) having a format such as that shown in FIG. 12. The message with the SYSTEM COMMAND CODE particularly includes the central station ID number in its alphanumeric data field.

Figure 10:
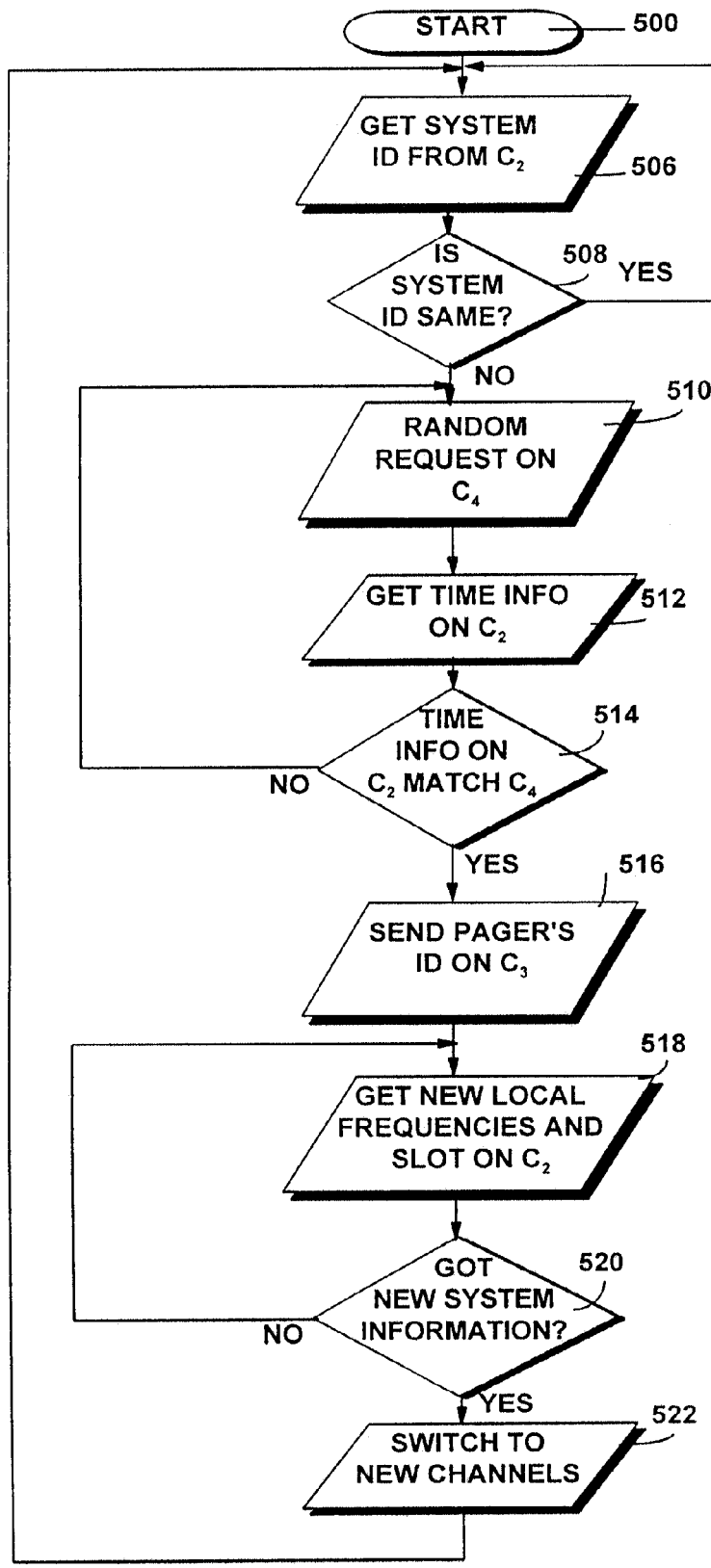
FIG. 10 is a flowchart depicting steps executed by the pager unit of FIG. 8 in connection with a channel switching operation.

At step 612, central control station 420 checks to determine if a request signal has been transmitted by any pager unit 422 on frequency $C_4$ (as occurred, for example, in context of the discussion of FIG. 10, particularly step 510). Such a request signal would likely be issued from a pager unit 422 which has just wandered into the CFRR controlled by the central control station (e.g., into $CFRR_2$ controlled by station S2). If no such request signal is detected, loop 602 is again repeated.

In the event that a request signal is detected at step 612, central control station 420 notes specifically the time slot on frequency $C_4$ at which the request occurred (step 614). At this point, such time slot is the only way central control station 420 can identify the in-wandering pager unit 422. Central control station 420 desires for the in-wandering pager unit 422 to transmit its identification (ID), but cannot specifically address the in-wandering pager other than with reference to the detected time slot. Accordingly, at step 616, central control station 420 prepares and transmits a message on frequency $C_2$ which has a SLOT RECOGNITION COMMAND CODE. The message including the SLOT RECOGNITION COMMAND CODE includes station S2 as the sender and mirrors the slot randomly generated by pager unit P1 (e.g, the time slot at which the in-wandering pager unit 422 issued its request). This transmission on frequency $C_2$ constitutes authority for pager unit P1 to transmit its identification.

Step 618 denotes acquisition by central control station 420 of the identification (ID) of the in-wandering pager unit 422. At step 620, central control station 420 checks its pager registration file 55 to determine if the pager ID is a valid ID. If not, an error message is generated and transmitted (at step 622), followed by a command for pager unit P1 to shut down (see step 624).

Assuming that the identification of pager unit 422 was validated at step 620, CPU 50 checks (at step 630) its pager directory file 56 to locate an available time slot for the in-wandering pager unit 422, and then associates the available time slot with the ID of the in-wandering pager unit 422. Then, at step 632, using a message on frequency $C_2$ with a LOCAL FREQUENCY DOWNLOAD COMMAND CODE, central control station 420 sends the values of its local frequencies (e.g., $f_5$, $f_6$, $f_7$, $f_8$) to the in-wandering pager unit 422. The central control station then (at step 634) assigns to the in-wandering pager unit 422 a new time slot on its local frequencies using a message on frequency $C_2$ with a SLOT ASSIGNMENT COMMAND CODE. Processing of the change time slot command by the in-wandering pager unit 422 is understood with analogous reference to FIG. 5, particularly steps 350, 352, and 354.

Upon completion of step 634, the in-wandering pager unit 422 is fully initiated into its new cell (e.g., $CELL_2$), and has left the jurisdiction of its former control station (e.g, $CELL_1$ and station S1). Accordingly, at step 636, CPU 50 requests its I/O interface to issue a command on serial line 486A which advises (using pager ID) that the in-wandering pager 422 is now under its jurisdiction, so that former jurisdictions (e.g., S1) can delete this pager unit from their pager directory files 56. Such deletion is understood with reference to steps 604-608 as above-described.

In addition to illustrating geographical location of pager P1, stations S1 and S2, and cells $CELL_1$ and $CELL_2$, FIG. 9 shows the relative timing of communications occurring on common frequencies $C_1$-$C_4$. FIG. 9 specifically relates the timing of communications transmissions to specific ones of the aforedescribed steps executed by central control station 420 (the switching enabling routine of FIG. 11) and by pager unit 422 (the channel switching routine of FIG. 10).

Although the central control stations $420_x$ use the same common frequencies $C_1$-$C_4$, there is no interference or confusion of these signals transmitted from the control stations $420_x$. The common frequencies $C_1$-$C_4$ are broadcast at a relatively lower power than the local frequencies $f_1$-$f_4$ so that reception of the common frequencies $C_1$-$C_4$ occurs only in a limited neighborhood (CFRR) about the central control station $420_x$. Accordingly, pager units 422 traveling through the system receive common frequencies $C_1$-$C_4$ only in the limited and non-overlapping CFRRs.

System operational characteristics, such as cell diameter, CFRR diameter, power level of the local frequencies (e.g., $f_1$-$f_4$), and power level of the common frequencies ($C_1$-$C_4$) can be field adjusted to suit numerous factors, including particularly the terrain and topography of the geographical region covered by the system. By way of non-limiting example, in one embodiment, the radius of each cell is on the order of about 20 miles; while the radius of each CFRR is on the order of about 10 miles or less. In the same example, the power for transmission of the local frequencies can be in a range of from about 3 watts to 1000 watts; while the power for transmission of the common frequencies $C_1$-$C_4$ is preferably less than 2 watts.

Thus, the invention provides a two-way paging system which operates independently from a telephone system for wireless data communication between users. The invention minimizes use of available frequencies allowed by the Federal Communications Commission (FCC), using only four local frequencies $f_1$-$f_4$ for any given cell and (for expanded, multi-cellular coverage) only four common or switching frequencies $C_1$-$C_4$. In order to minimize the number of frequencies (e.g, channels) utilized, techniques of time division sharing and synchronization are employed. A transmission power differential between the local frequencies and the common frequencies is also employed. These techniques allow data transmission to be kept separate from different pagers and thus eliminate merging of data.

The switching technique of the present invention provides extended geographical coverage and minimizes paging time by increasing the number of frequencies utilized in a cell from four (e.g, the four local frequencies) to eight (the four local frequencies plus the four common frequencies).

In connection with verification of pager ID, it should be understood that a single pager registration file might be stored in a memory file of only one of a plurality of central control stations, and that in such case verification would constitute issuing a search command (on the serial links 486) to locate a pager ID in the one (remote) memory file, with the results of the search being reported back to the inquiring central control station.

The keyboards illustrated herein can, in some embodiments, be multi-language keyboards or writing pads which permit typing of English, Chinese, or Japanese languages, for example. The writing pad is especially useful in countries such as Japan, Thailand, the Middle East or China where English-like alphabets are not used. The writing pad could also be used to sketch and transmit graphics. Moreover, data compression/de-compression techniques can be utilized in connection with data transfer.

While the invention has been particularly shown and described with reference to the preferred embodiments thereof, it will be understood by those skilled in the art that various alterations in form and detail may be made therein without departing from the spirit and scope of the invention. For example, it should be understood that repeaters may be employed within cells to facilitate transmission when a pager unit ventures far from a central control station.

What is claimed:

1. A method of operating a data communication system, the data communication system comprising a network which includes at least one communication controller and at least one node, the method comprising:

transmitting a first upstream signal from a first node to a first communication controller, said first upstream signal comprising a random access request in a first slot;

receiving a first downstream signal transmitted from the first communication controller at the first node, said first downstream signal being received subsequent to transmission of the first upstream signal, said first downstream signal acknowledging receipt of said first upstream signal, said first downstream signal comprising information referencing a first slot number wherein the first node transmitted said random access request in order for the first node to identify that the first node is a desired recipient of the first downstream signal;

transmitting a second upstream signal from the first node to the first communication controller, said second upstream signal being transmitted subsequent to receiving said first downstream signal, said second upstream signal from the first node comprising identifier information for the first node;

receiving second downstream signaling information transmitted from the first communication controller at the first node, said second downstream signaling information being received subsequent to transmission of said second upstream signal, said second downstream signaling information comprising information relating to an allocation of a second slot to the first node for transmitting a reserve request;

transmitting a third upstream signal from the first node to the first communication controller, said third upstream signal being transmitted subsequent to receiving the second downstream signaling information, said third upstream signal comprising the reserve request which is transmitted within the second slot allocated to the first node;

receiving a third downstream signal transmitted from the first communication controller at the first node, said third downstream signal received subsequent to transmission of the reserve request, said third downstream signal comprising information relating to an allocation of resources for transmitting a packetized message; and transmitting the packetized message from the first node to the first communication controller subsequent to receiving the third downstream signal.

2. The method of claim 1,
wherein the first communication controller transmits information relating to an allocation of a third slot to a second node for transmitting an additional reserve request,
wherein the additional reserve request transmitted by the second node into the third slot allocated to the second node that can be transmitted during transmission of the packetized message by the first node,
wherein said additional reserve request transmitted by the second node is transmitted on a differing frequency than said packetized message transmitted by the first node.

3. The method of claim 1,
wherein the first communication controller transmits information relating to an allocation of a third slot to a second node for transmitting an additional reserve request,
wherein the additional reserve request transmitted by the second node into the third slot allocated to the second node can be transmitted during transmission of the packetized message by the first node.

4. The method of claim 1,
wherein the first upstream signal is transmitted on a first frequency;
wherein the first downstream signal is received on a second frequency which differs from the first frequency;
wherein the third upstream signal is transmitted on a third frequency which differs from the first frequency and the second frequency.

5. The method of claim 1,
wherein the first upstream signal is transmitted on a first frequency;
wherein the first downstream signal is received on a second frequency which differs from the first frequency;
wherein the third downstream signal is received on a third frequency which differs from the first frequency and the second frequency.

6. The method of claim 1,
wherein the first upstream signal is transmitted on a first frequency;
wherein the first downstream signal is received on a second frequency which differs from the first frequency;
wherein the third upstream signal is transmitted on a third frequency which differs from the first frequency and the second frequency; and
wherein the third downstream signal is received on a fourth frequency which differs from the first frequency, the second frequency and the third frequency.

7. The method of claim 1,
wherein the packetized message comprises data packets;
wherein the data packets may include information related to a sequence number, and
wherein a final data packet from the packetized message may further comprise information related to terminal indication information indicating that the final data packet is a last data packet.

8. The method of claim 1, wherein said third downstream signal is provided to the first node in recurring subsequent downstream transmissions.

9. A method of operating a data communication system, the data communication system comprising a network which includes at least one communication controller and at least one node, the method comprising:

transmitting a first upstream signal from a first node to a first communication controller, said first upstream signal comprising a random access request in a first slot;

receiving a first downstream signal transmitted from the first communication controller at the first node, said first downstream signal being received subsequent to transmission of the first upstream signal, said first downstream signal acknowledging receipt of said first upstream signal, said first downstream signal comprising information referencing a first slot number wherein the first node transmitted said random access request in order for the first node to identify that the first node is a desired recipient of the first downstream signal;

transmitting a second upstream signal from the first node to the first communication controller, said second upstream signal being transmitted subsequent to receiving said first downstream signal, said second upstream signal from the first node comprising identifier information for the first node;

receiving second downstream signaling information transmitted from the first communication controller at the first node, said second downstream signaling information being received subsequent to transmission of the second upstream signal, said second downstream signaling information comprising information relating to an allocation of a second slot to the first node for transmitting a reserve request;

transmitting a third upstream signal from the first node to the first communication controller, said third upstream signal being transmitted subsequent to receiving the second downstream signaling information, said third upstream signal comprising the reserve request which is transmitted within the second slot allocated to the first node;

receiving a third downstream signal transmitted from the first communication controller at the first node, said third downstream signal received subsequent to transmission of the reserve request, said third downstream signal comprising information relating to an allocation of resources for transmitting a packetized message; and transmitting the packetized message from the first node to the first communication controller subsequent to receiving the third downstream signal, wherein the availability of said second slot allocated to the first node recurs until use of the second slot by the first node is disabled.

10. The method of claim 9, wherein the first communication controller transmits information relating to an allocation of a third slot to a second node for transmitting an additional reserve request, wherein the additional reserve request transmitted by the second node into the third slot allocated to the second node that can be transmitted during transmission of the packetized message by the first node, wherein said additional reserve request transmitted by the second node is transmitted on a differing frequency than said packetized message transmitted by the first node.

11. The method of claim 9, wherein the first communication controller transmits information relating to an allocation of a third slot to a second node for transmitting an additional reserve request, wherein the additional reserve request transmitted by the second node into the third slot allocated to the second node can be transmitted during transmission of the packetized message by the first node.

12. The method of claim 9, wherein the first upstream signal is transmitted on a first frequency;

wherein the first downstream signal is received on a second frequency which differs from the first frequency;

wherein the third upstream signal is transmitted on a third frequency which differs from the first frequency and the second frequency.

13. The method of claim 9, wherein the first upstream signal is transmitted on a first frequency;

wherein the first downstream signal is received on a second frequency which differs from the first frequency;

wherein the third downstream signal is received on a third frequency which differs from the first frequency and the second frequency.

14. The method of claim 9, wherein the first upstream signal is transmitted on a first frequency;

wherein the first downstream signal is received on a second frequency which differs from the first frequency;

wherein the third upstream signal is transmitted on a third frequency which differs from the first frequency and the second frequency; and wherein the third downstream signal is received on a fourth frequency which differs from the first frequency, the second frequency and the third frequency.

15. The method of claim 9, wherein the packetized message comprises data packets;

wherein the data packets may include information related to a sequence number, and wherein a final data packet from the packetized message may further comprise information related to terminal indication information indicating that the final data packet is a last data packet.

16. The method of claim 9, wherein said third downstream signal is provided to the first node in recurring subsequent downstream transmissions, wherein the third downstream signal which recurs in subsequent downstream transmissions may be disabled through de-allocation of this resource such that the first node no longer receives recurring allocation of this resource.

17. A method of operating a data communication system, the data communication system comprising a network which includes at least one communication controller and at least one node, the method comprising:

transmitting a first upstream signal from a first node to a first communication controller, said first upstream signal comprising a random access request in a first slot;

receiving a first downstream signal transmitted from the first communication controller at the first node, said first downstream signal being received subsequent to transmission of the first upstream signal, said first downstream signal acknowledging receipt of said first upstream signal, said first downstream signal comprising information referencing a first slot number wherein the first node transmitted said random access request in order for the first node to identify that the first node is a desired recipient of the first downstream signal;

transmitting a second upstream signal from the first node to the first communication controller, said second upstream signal being transmitted subsequent to receiving said first downstream signal, said second upstream signal from the first node comprising identifier information for the first node;

receiving second downstream signaling information transmitted from the first communication controller at the first node, said second downstream signaling information being received subsequent to transmission of the second upstream signal, said second downstream signaling information comprising information relating to an allocation of a second slot to the first node for transmitting a reserve request;

transmitting a third upstream signal from the first node to the first communication controller, said third upstream signal being transmitted subsequent to receiving the second downstream signaling information, said third upstream signal comprising the reserve request which is transmitted within the second slot allocated to the first node;

receiving a third downstream signal transmitted from the first communication controller at the first node, said third downstream signal received subsequent to transmission of the reserve request, said third downstream signal comprising information relating to an allocation of resources for transmitting a packetized message; and transmitting the packetized message from the first node to the first communication controller subsequent to receiving the third downstream signal, wherein the availability of said second slot allocated to the first node recurs until use of the second slot by the first node is disabled, wherein the availability of the second slot to the first node may be disabled through de-allocation of the second slot such that the second slot is not available to the first node to transmit a subsequent reserve request.

18. The method of claim 17,
wherein the first communication controller transmits information relating to an allocation of a third slot to a second node for transmitting an additional reserve request,
wherein the additional reserve request transmitted by the second node into the third slot allocated to the second node that can be transmitted during transmission of the packetized message by the first node,
wherein said additional reserve request transmitted by the second node is transmitted on a differing frequency than said packetized message transmitted by the first node.

19. The method of claim 17,
wherein the first communication controller transmits information relating to an allocation of a third slot to a second node for transmitting an additional reserve request,
wherein the additional reserve request transmitted by the second node into the third slot allocated to the second node can be transmitted during transmission of the packetized message by the first node.

20. The method of claim 17,
wherein the first upstream signal is transmitted on a first frequency;
wherein the first downstream signal is received on a second frequency which differs from the first frequency;
wherein the third upstream signal is transmitted on a third frequency which differs from the first frequency and the second frequency.

21. The method of claim 17,
wherein the first upstream signal is transmitted on a first frequency;
wherein the first downstream signal is received on a second frequency which differs from the first frequency;
wherein the third downstream signal is received on a third frequency which differs from the first frequency and the second frequency.

22. The method of claim 17,
wherein the first upstream signal is transmitted on a first frequency;
wherein the first downstream signal is received on a second frequency which differs from the first frequency;
wherein the third upstream signal is transmitted on a third frequency which differs from the first frequency and the second frequency; and
wherein the third downstream signal is received on a fourth frequency which differs from the first frequency, the second frequency and the third frequency.

23. The method of claim 17,
wherein the packetized message comprises data packets;
wherein the data packets may include information related to a sequence number, and
wherein a final data packet from the packetized message may further comprise information related to terminal indication information indicating that the final data packet is a last data packet.

24. The method of claim 17,
wherein said third downstream signal is provided to the first node in recurring subsequent downstream transmissions,
wherein the third downstream signal which recurs in subsequent downstream transmissions may be disabled through de-allocation of this resource such that the first node no longer receives recurring allocation of this resource.

25. A method of operating a data communication system, the data communication system comprising a network which includes at least one communication controller and at least one node, the method comprising:
transmitting a first upstream signal from a first node to a first communication controller, said first upstream signal comprising a random access request in a first slot;
receiving a first downstream signal transmitted from the first communication controller at the first node, said first downstream signal being received subsequent to transmission of the first upstream signal, said first downstream signal acknowledging receipt of said first upstream signal, said first downstream signal comprising information referencing a first slot number wherein the first node transmitted said random access request in order for the first node to identify that the first node is a desired recipient of the first downstream signal;
transmitting a second upstream signal from the first node to the first communication controller, said second upstream signal being transmitted subsequent to receiving said first downstream signal, said second upstream signal from the first node comprising identifier information for the first node;
receiving second downstream signaling information transmitted from the first communication controller at the first node, said second downstream signaling information being received subsequent to transmission of the second upstream signal, said second downstream signaling information comprising information relating to an allocation of at least a plurality of frequencies for the first node to utilize for transmitting and receiving signals, said second downstream signaling information further comprising an allocation of a second slot to the first node for transmitting a reserve request;
transmitting a third upstream signal from the first node to the first communication controller, said third upstream signal being transmitted subsequent to receiving the second downstream signaling information, said third upstream signal comprising the reserve request which is transmitted within the second slot allocated to the first node;
receiving a third downstream signal transmitted from the first communication controller at the first node, said third downstream signal received subsequent to transmission of the reserve request, said third downstream signal comprising information relating to an allocation of resources for transmitting a packetized message; and
transmitting the packetized message from the first node to the first communication controller subsequent to receiving the third downstream signal,
wherein the availability of said second slot allocated to the first node recurs until use of the second slot by the first node is disabled.

26. The method of claim 25,
wherein the first communication controller transmits information relating to an allocation of a third slot to a second node for transmitting an additional reserve request,
wherein the additional reserve request transmitted by the second node into the third slot allocated to the second node that can be transmitted during transmission of the packetized message by the first node,
wherein said additional reserve request transmitted by the second node is transmitted on a differing frequency than said packetized message transmitted by the first node.

27. The method of claim 25,
wherein the first communication controller transmits information relating to an allocation of a third slot to a second node for transmitting an additional reserve request,
wherein the additional reserve request transmitted by the second node into the third slot allocated to the second node can be transmitted during transmission of the packetized message by the first node.

28. The method of claim 25,
wherein the first upstream signal is transmitted on a first frequency;
wherein the first downstream signal is received on a second frequency which differs from the first frequency;
wherein the third upstream signal is transmitted on a third frequency which differs from the first frequency and the second frequency.

29. The method of claim 25,
wherein the first upstream signal is transmitted on a first frequency;
wherein the first downstream signal is received on a second frequency which differs from the first frequency;
wherein the third downstream signal is received on a third frequency which differs from the first frequency and the second frequency.

30. The method of claim 25,
wherein the first upstream signal is transmitted on a first frequency;
wherein the first downstream signal is received on a second frequency which differs from the first frequency;
wherein the third upstream signal is transmitted on a third frequency which differs from the first frequency and the second frequency; and
wherein the third downstream signal is received on a fourth frequency which differs from the first frequency, the second frequency and the third frequency.

31. The method of claim 25,
wherein the packetized message comprises data packets;
wherein the data packets may include information related to a sequence number, and
wherein a final data packet from the packetized message may further comprise information related to terminal indication information indicating that the final data packet is a last data packet.

32. The method of claim 25, wherein said third downstream signal is provided to the first node in recurring subsequent downstream transmissions.

33. A method of operating a data communication system, the data communication system comprising a network which includes at least one communication controller and at least one node, the method comprising:
receiving a first downstream signal transmitted from a first communication controller at a first node, said first downstream signal authorizing communication from the first node;
transmitting a first upstream signal from the first node to the first communication controller, said upstream signal being transmitted subsequent to receiving said first downstream signal, said first upstream signal being transmitted to acknowledge receipt of said authorization for communication;
receiving a second downstream signal transmitted from the first communication controller at the first node, said second downstream signal being received subsequent to transmission of the first upstream signal, said second downstream signal comprising information relating to an allocation of a slot to the first node for transmitting a reserve request;
transmitting a second upstream signal from the first node to the first communication controller, said second upstream signal being transmitted subsequent to receiving the second downstream signal, said second upstream signal comprising the reserve request which is transmitted within the slot allocated to the first node;
receiving a third downstream signal transmitted from the first communication controller at the first node, said third downstream signal received subsequent to transmission of the reserve request, said third downstream signal comprising information relating to an allocation of resources for transmitting a packetized message; and
transmitting the packetized message from the first node to the first communication controller subsequent to receiving the third downstream signal,
wherein the packetized message comprises data packets;
wherein the availability of said slot allocated to the first node recurs until use of the slot by the first node is disabled,
wherein the availability of the slot to the first node may be disabled through de-allocation of the slot such that the slot is not available to the first node to transmit a subsequent reserve request.

34. The method of claim 33,
wherein the first communication controller transmits information relating to an allocation of an additional slot to a second node for transmitting an additional reserve request,
wherein the additional reserve request transmitted by the second node into the additional slot allocated to the second node that can be transmitted during transmission of the packetized message by the first node,
wherein said additional reserve request transmitted by the second node is transmitted on a differing frequency than said packetized message transmitted by the first node.

35. The method of claim 33,
wherein the first communication controller transmits information relating to an allocation of an additional slot to a second node for transmitting an additional reserve request,
wherein the additional reserve request transmitted by the second node into the additional slot allocated to the second node can be transmitted during transmission of the packetized message by the first node.

36. The method of claim 33, further comprising the steps of:
transmitting a initial upstream signal from the first node to the first communication controller prior to receiving the first downstream signal from the first communication controller, said first upstream signal comprising a initial request in a initial slot,
wherein said initial upstream signal comprises randomly generated information from the first node, and
wherein the first downstream returns said randomly generated information to the first node in order for the first node to identify that the first node is a desired recipient of the first downstream signal.

37. The method of claim 36,
wherein said third downstream signal is provided to the first node in recurring subsequent downstream transmissions,
wherein the third downstream signal which recurs in subsequent downstream transmissions may be disabled through de-allocation of this resource such that the first node no longer receives recurring allocation of this resource.

38. The method of claim 33,
wherein the first downstream signal is received on a first frequency;
wherein the second upstream signal is transmitted on a second frequency which differs from the first frequency; and wherein the third downstream signal is received on a third frequency which differs from the first frequency and the second frequency.

39. The method of claim 33,
wherein the data packets may include information related to a sequence number, and
wherein a final data packet from the packetized message may further comprise information related to terminal indication information indicating that the final data packet is a last data packet.

40. The method of claim 33, wherein said third downstream signal is provided to the first node in recurring subsequent downstream transmissions,
wherein the third downstream signal which recurs in subsequent downstream transmissions may be disabled through de-allocation of this resource such that the first node no longer receives recurring allocation of this resource.

41. A method of operating a data communication system, the data communication system comprising a network which includes at least one communication controller and at least one node, the method comprising:
receiving a first upstream signal transmitted from a first node to a first communication controller, said first upstream signal comprising a random access request in a first slot from the first node;
transmitting a first downstream signal from the first communication controller at the first node, said first downstream signal being transmitted subsequent to reception of the first upstream signal, said first downstream signal comprising information which acknowledges receipt of said first upstream signal, said first downstream signal comprising information referencing a first slot number wherein the first node transmitted said random access request in order for the first node to identify that the first node is a desired recipient of the first downstream signal;
receiving a second upstream signal transmitted from the first node to the first communication controller, said second upstream signal being received subsequent to the transmission of said first downstream signal, said second upstream signal from the first node comprising identifier information for the first node;
transmitting a second downstream signaling information from the first communication controller at the first node, said second downstream signaling information being transmitted subsequent to the reception of said second upstream signal, said second downstream signaling information comprising information relating to an allocation of a second slot to the first node for the first node to transmit a reserve request;
receiving a third upstream signal transmitted from the first node to the first communication controller, said third upstream signal being received subsequent to the transmission of the second downstream signaling information, said third upstream signal comprising the reserve request from the first node which is transmitted within the second slot allocated to the first node;
transmitting a third downstream signal from the first communication controller at the first node, said third downstream signal being transmitted subsequent to the reception of the reserve request, said third downstream signal comprising information relating to an allocation of resources to the first node for the first node to transmit a packetized message; and
receiving the packetized message transmitted from the first node to the first communication controller subsequent to the transmission of the third downstream signal.

42. The method of claim 41,
wherein the first communication controller transmits information relating to an allocation of a third slot to a second node for transmitting an additional reserve request,
wherein the additional reserve request from the second node can be received during reception of the packetized message by the first node,
wherein the additional reserve request is received in the third slot allocated to the second node by the first communication controller,
wherein said additional reserve request received from the second node is received on a differing frequency than said packetized message received from the first node.

43. The method of claim 41,
wherein the first communication controller transmits information relating to an allocation of a third slot to a second node for transmitting an additional reserve request,
wherein the additional reserve request from the second node can be received during reception of the packetized message by the first node,
wherein the additional reserve request is received in the third slot allocated to the second node by the first communication controller.

44. The method of claim 41,
wherein the first upstream signal is received on a first frequency;
wherein the first downstream signal is transmitted on a second frequency which differs from the first frequency;
wherein the third upstream signal is received on a third frequency which differs from the first frequency and the second frequency.

45. The method of claim 41,
wherein the first upstream signal is received on a first frequency;
wherein the first downstream signal is transmitted on a second frequency which differs from the first frequency;
wherein the third downstream signal is transmitted on a third frequency which differs from the first frequency and the second frequency.

46. The method of claim 41,
wherein the first upstream signal is received on a first frequency;
wherein the first downstream signal is transmitted on a second frequency which differs from the first frequency;
wherein the third upstream signal is received on a third frequency which differs from the first frequency and the second frequency; and
wherein the third downstream signal is transmitted on a fourth frequency which differs from the first frequency, the second frequency and the third frequency.

47. The method of claim 41,
wherein the packetized message comprises data packets;
wherein the data packets may include information related to a sequence number, and
wherein a final data packet from the packetized message may further comprise information related to terminal indication information indicating that the final data packet is a last data packet.

48. The method of claim 41, wherein said third downstream signal is provided to the first node in recurring subsequent downstream transmissions.

49. A method of operating a data communication system, the data communication system comprising a network which includes at lease one communication controller and at least one node, the method comprising:
receiving a first upstream signal transmitted from a first node to a first communication controller, said first upstream signal comprising a random access request in a first slot from the first node, wherein said first upstream signal comprises randomly generated information from the first node;

transmitting a first downstream signal from the first communication controller at the first node, said first downstream signal being transmitted subsequent to reception of the first upstream signal, said first downstream signal comprising information which acknowledges receipt of said first upstream signal, said first downstream signal comprising information referencing a first slot number wherein the first node transmitted said random access request, said first downstream signal further comprising a return of said randomly generated information to the first node, wherein said information referencing the first slot number and said randomly generated information are sent from the first communication controller in order for the first node to identify that the first node is a desired recipient of the first downstream signal;

receiving a second upstream signal transmitted from the first node to the first communication controller, said second upstream signal being received subsequent to the transmission of said first downstream signal, said second upstream signal from the first node comprising identifier information for the first node;

transmitting a second downstream signaling information from the first communication controller at the first node, said second downstream signaling information being transmitted subsequent to the reception of said second upstream signal, said second downstream signaling information comprising information relating to an allocation of a second slot to the first node for the first node to transmit a reserve request;

receiving a third upstream signal transmitted from the first node to the first communication controller, said third upstream signal being received subsequent to the transmission of the second downstream signaling information, said third upstream signal comprising the reserve request from the first node which is transmitted within the second slot allocated to the first node;

transmitting a third downstream signal from the first communication controller at the first node, said third downstream signal being transmitted subsequent to the reception of the reserve request, said third downstream signal comprising information relating to an allocation of resources to the first node for the first node to transmit a packetized message; and receiving the packetized message transmitted from the first node to the first communication controller subsequent to the transmission of the third downstream signal,
wherein the availability of said second slot allocated to the first node recurs until use of the second slot by the first node is disabled.

50. The method of claim 49,
wherein the first communication controller transmits information relating to an allocation of a third slot to a second node for transmitting an additional reserve request,
wherein the additional reserve request from the second node can be received during reception of the packetized message by the first node,
wherein the additional reserve request is received in the third slot allocated to the second node by the first communication controller,
wherein said additional reserve request received from the second node is received on a differing frequency than said packetized message received from the first node.

51. The method of claim 49,
wherein the first communication controller transmits information relating to an allocation of a third slot to a second node for transmitting an additional reserve request,
wherein the additional reserve request from the second node can be received during reception of the packetized message by the first node,
wherein the additional reserve request is received in the third slot allocated to the second node by the first communication controller.

52. The method of claim 49,
wherein the first upstream signal is received on a first frequency;
wherein the first downstream signal is transmitted on a second frequency which differs from the first frequency;
wherein the third upstream signal is received on a third frequency which differs from the first frequency and the second frequency.

53. The method of claim 49,
wherein the first upstream signal is received on a first frequency;
wherein the first downstream signal is transmitted on a second frequency which differs from the first frequency;
wherein the third downstream signal is transmitted on a third frequency which differs from the first frequency and the second frequency.

54. The method of claim 49,
wherein the first upstream signal is received on a first frequency;
wherein the first downstream signal is transmitted on a second frequency which differs from the first frequency;
wherein the third upstream signal is received on a third frequency which differs from the first frequency and the second frequency; and
wherein the third downstream signal is transmitted on a fourth frequency which differs from the first frequency, the second frequency and the third frequency.

55. The method of claim 49,
wherein the packetized message comprises data packets;
wherein the data packets may include information related to a sequence number, and
wherein a final data packet from the packetized message may further comprise information related to terminal indication information indicating that the final data packet is a last data packet.

56. The method of claim 49, wherein said third downstream signal is provided to the first node in recurring subsequent downstream transmissions.

57. A method of operating a data communication system, the data communication system comprising a network which includes at least one communication controller and at least one node, the method comprising:
receiving a first upstream signal transmitted from a first node to a first communication controller, said first upstream signal comprising a random access request in a first slot from the first node;
transmitting a first downstream signal from the first communication controller at the first node, said first downstream signal being transmitted subsequent to reception of the first upstream signal, said first downstream signal comprising information which acknowledges receipt of said first upstream signal, said first downstream signal comprising information referencing a first slot number wherein the first node transmitted said random access request in order for the first node to identify that the first node is a desired recipient of the first downstream signal;

receiving a second upstream signal transmitted from the first node to the first communication controller, said second upstream signal being received subsequent to the transmission of said first downstream signal, said second upstream signal from the first node comprising identifier information for the first node;

transmitting a second downstream signaling information from the first communication controller at the first node, said second downstream signaling information being transmitted subsequent to the reception of said second upstream signal, said second downstream signaling information comprising information relating to an allocation of a second slot to the first node for transmitting a reserve request;

receiving a third upstream signal transmitted from the first node to the first communication controller, said third upstream signal being received subsequent to the transmission of the second downstream signaling information, said third upstream signal comprising the reserve request from the first node which is transmitted within the second slot allocated to the first node;

transmitting a third downstream signal from the first communication controller at the first node, said third downstream signal being transmitted subsequent to the reception of the reserve request, said third downstream signal comprising information relating to an allocation of resources to the first node for the first node to transmit a packetized message; and receiving the packetized message transmitted from the first node to the first communication controller subsequent to the transmission of the third downstream signal,
wherein the availability of said second slot allocated to the first node recurs until use of the second slot by the first node is disabled,
wherein the availability of the second slot to the first node may be disabled through de-allocation of the second slot such that the second slot is not available to the first node to transmit a subsequent reserve request.

58. The method of claim 57,
wherein the first communication controller transmits information relating to an allocation of a third slot to a second node for transmitting an additional reserve request,
wherein the additional reserve request from the second node can be received during reception of the packetized message by the first node,
wherein the additional reserve request is received in the third slot allocated to the second node by the first communication controller,
wherein said additional reserve request received from the second node is received on a differing frequency than said packetized message received from the first node.

59. The method of claim 57,
wherein the first communication controller transmits information relating to an allocation of a third slot to a second node for transmitting an additional reserve request,
wherein the additional reserve request from the second node can be received during reception of the packetized message by the first node,
wherein the additional reserve request is received in the third slot allocated to the second node by the first communication controller.

60. The method of claim 57,
wherein the first upstream signal is received on a first frequency;
wherein the first downstream signal is transmitted on a second frequency which differs from the first frequency;
wherein the third upstream signal is received on a third frequency which differs from the first frequency and the second frequency.

61. The method of claim 57,
wherein the first upstream signal is received on a first frequency;
wherein the first downstream signal is transmitted on a second frequency which differs from the first frequency;
wherein the third downstream signal is transmitted on a third frequency which differs from the first frequency and the second frequency.

62. The method of claim 57,
wherein the first upstream signal is received on a first frequency;
wherein the first downstream signal is transmitted on a second frequency which differs from the first frequency;
wherein the third upstream signal is received on a third frequency which differs from the first frequency and the second frequency; and
wherein the third downstream signal is transmitted on a fourth frequency which differs from the first frequency, the second frequency and the third frequency.

63. The method of claim 57,
wherein the packetized message comprises data packets;
wherein the data packets may include information related to a sequence number, and
wherein a final data packet from the packetized message may further comprise information related to terminal indication information indicating that the final data packet is a last data packet.

64. The method of claim 57,
wherein said third downstream signal is provided to the first node in recurring subsequent downstream transmissions,
wherein the third downstream signal which recurs in subsequent downstream transmissions may be disabled through de-allocation of this resource such that the first node no longer receives recurring allocation of this resource.

65. A method of operating a data communication system, the data communication system comprising a network which includes at least one communication controller and at least one node, the method comprising:
receiving a first upstream signal transmitted from a first node to a first communication controller, said first upstream signal comprising a random access request in a first slot from the first node, wherein said first upstream signal comprises randomly generated information from the first node;

transmitting a first downstream signal from the first communication controller at the first node, said first downstream signal being transmitted subsequent to reception of the first upstream signal, said first downstream signal comprising information which acknowledges receipt of said first upstream signal, said first downstream signal comprising information referencing a first slot number wherein the first node transmitted said random access request, said first downstream signal further comprising a return of said randomly generated information to the first node, wherein said information referencing the first slot number and said randomly generated information are sent from the first communication controller in order for the first node to identify that the first node is a desired recipient of the first downstream signal;

receiving a second upstream signal transmitted from the first node to the first communication controller, said second upstream signal being received subsequent to the transmission of said first downstream signal, said second upstream signal from the first node comprising identifier information for the first node;

transmitting a second downstream signaling information from the first communication controller at the first node, said second downstream signaling information being transmitted subsequent to the reception of said second upstream signal, said second downstream signaling information comprising information relating to an allocation of at least a plurality of frequencies for the first node to utilize for transmitting and receiving signals, said second downstream signaling information further comprising information relating to an allocation of a second slot to the first node for transmitting a reserve request;

receiving a third upstream signal transmitted from the first node to the first communication controller, said third upstream signal being received subsequent to the transmission of the second downstream signaling information, said third upstream signal comprising the reserve request from the first node which is transmitted within the second slot allocated to the first node;

transmitting a third downstream signal from the first communication controller at the first node, said third downstream signal being transmitted subsequent to the reception of the reserve request, said third downstream signal comprising information relating to an allocation of resources to the first node for the first node to transmit a packetized message; and receiving the packetized message transmitted from the first node to the first communication controller subsequent to the transmission of the third downstream signal,
wherein the availability of said second slot allocated to the first node recurs until use of the second slot by the first node is disabled.

66. The method of claim 65,
wherein the first communication controller transmits information relating to an allocation of a third slot to a second node for transmitting an additional reserve request,
wherein the additional reserve request from the second node can be received during reception of the packetized message by the first node,
wherein the additional reserve request is received in the third slot allocated to the second node by the first communication controller,
wherein said additional reserve request received from the second node is received on a differing frequency than said packetized message received from the first node.

67. The method of claim 65,
wherein the first communication controller transmits information relating to an allocation of a third slot to a second node for transmitting an additional reserve request,
wherein the additional reserve request from the second node can be received during reception of the packetized message by the first node,
wherein the additional reserve request is received in the third slot allocated to the second node by the first communication controller.

68. The method of claim 65,
wherein the first upstream signal is received on a first frequency;
wherein the first downstream signal is transmitted on a second frequency which differs from the first frequency;
wherein the third upstream signal is received on a third frequency which differs from the first frequency and the second frequency.

69. The method of claim 65,
wherein the first upstream signal is received on a first frequency;
wherein the first downstream signal is transmitted on a second frequency which differs from the first frequency;
wherein the third downstream signal is transmitted on a third frequency which differs from the first frequency and the second frequency.

70. The method of claim 65,
wherein the first upstream signal is received on a first frequency;
wherein the first downstream signal is transmitted on a second frequency which differs from the first frequency;
wherein the third upstream signal is received on a third frequency which differs from the first frequency and the second frequency; and
wherein the third downstream signal is transmitted on a fourth frequency which differs from the first frequency, the second frequency and the third frequency.

71. The method of claim 65,
wherein the packetized message comprises data packets;
wherein the data packets may include information related to a sequence number, and
wherein a final data packet from the packetized message may further comprise information related to terminal indication information indicating that the final data packet is a last data packet.

72. The method of claim 65, wherein said third downstream signal is provided to the first node in recurring subsequent downstream transmissions.

73. A method of operating a data communication system, the data communication system comprising a network which includes at least one communication controller and at least one node, the method comprising:
transmitting a first downstream signal from a first communication controller at a first node, said first downstream signal authorizing communication from the first node;
receiving a first upstream signal transmitted from the first node to the communication controller, said first upstream signal being received subsequent to the transmission of said first downstream signal, said first upstream signal from the first node acknowledging receipt of said authorization for communication;
transmitting a second downstream signal from the first communication controller at the first node, said second downstream signal being transmitted subsequent to the reception of said first upstream signal, said second downstream signal comprising information relating to an allocation of a slot to the first node for transmitting a reserve request;
receiving a second upstream signal transmitted from the first node to the first communication controller, said second upstream signal being received subsequent to the transmission of the second downstream signal, said second upstream signal comprising the reserve request from the first node which is transmitted within the slot allocated to the first node;
transmitting a third downstream signal from the first communication controller at the first node, said third downstream signal being transmitted subsequent to the reception of the reserve request, said third downstream signal comprising information relating to an allocation of resources to the first node for the first node to transmit a packetized message; and
receiving the packetized message transmitted from the first node to the first communication controller subsequent to the transmission of the third downstream signal, wherein the packetized message comprises data packets;
wherein the availability of said slot allocated to the first node recurs until use of the slot by the first node is disabled,
wherein the availability of the slot to the first node may be disabled through de-allocation of the slot such that the slot is not available to the first node to transmit a subsequent reserve request.

74. The method of claim 73,
wherein the first communication controller transmits information relating to an allocation of an additional slot to a second node for transmitting an additional reserve request,
wherein the additional reserve request from the second node can be received during reception of the packetized message by the first node,
wherein the additional reserve request is received in the additional slot allocated to the second node by the first communication controller,
wherein said additional reserve request received from the second node is received on a differing frequency than said packetized message received from the first node.

75. The method of claim 73,
wherein the first communication controller transmits information relating to an allocation of an additional slot to a second node for transmitting an additional reserve request,
wherein the additional reserve request from the second node can be received during reception of the packetized message by the first node,
wherein the additional reserve request is received in the additional slot allocated to the second node by the first communication controller.

76. The method of claim 73,
transmitting a initial upstream signal from the first node to the first communication controller prior to receiving the first downstream signal from the first communication controller, said first upstream signal comprising a initial request in a initial slot,
wherein said initial upstream signal comprises randomly generated information from the first node, and
wherein the first downstream returns said randomly generated information to the first node in order for the first node to identify that the first node is a desired recipient of the first downstream signal.

77. The method of claim 76,
wherein said third downstream signal is provided to the first node in recurring subsequent downstream transmissions,
wherein the third downstream signal which recurs in subsequent downstream transmissions may be disabled through de-allocation of this resource such that the first node no longer receives recurring allocation of this resource.

78. The method of claim 73,
wherein the first downstream signal is transmitted on a first frequency;
wherein the second upstream signal is received on a second frequency which differs from the first frequency; and
wherein the third downstream signal is transmitted on a third frequency which differs from the first frequency and the second frequency.

79. The method of claim 73,
wherein the data packets may include information related to a sequence number, and
wherein a final data packet from the packetized message may further comprise information related to terminal indication information indicating that the final data packet is a last data packet.

80. The method of claim 73, wherein said third downstream signal is provided to the first node in recurring subsequent downstream transmissions,
wherein the third downstream signal which recurs in subsequent downstream transmissions may be disabled through de-allocation of this resource such that the first node no longer receives recurring allocation of this resource.

81. A method of operating a data communication system, the data communication system comprising a network which includes at least one communication controller and at least one node, the method comprising:
transmitting a first upstream signal from a first node to a first communication controller, said first upstream signal comprising a random access request in a first slot, wherein said first upstream signal comprises randomly generated information from the first node;
receiving a first downstream signal transmitted from the first communication controller at the first node, said first downstream signal being received subsequent to transmission of the first upstream signal, said first downstream signal acknowledging receipt of said first upstream signal, said first downstream signal comprising information referencing a first slot number wherein the first node transmitted said random access request, said first downstream signal further comprising a return of said randomly generated information to the first node, wherein said information referencing the first slot number and said randomly generated information are sent from the first communication controller in order for the first node to identify that the first node is a desired recipient of the first downstream signal;
transmitting a second upstream signal from the first node to the first communication controller, said second upstream signal being transmitted subsequent to receiving said first downstream signal, said second upstream signal from the first node comprising identifier information for the first node;
receiving second downstream signaling information transmitted from the first communication controller at the first node, said second downstream signaling information being received subsequent to transmission of the second upstream signal, said second downstream signaling information comprising an allocation of a second slot to the first node for transmitting a reserve request;
transmitting a third upstream signal from the first node to the first communication controller, said third upstream signal being transmitted subsequent to receiving the second downstream signaling information, said third upstream signal comprising the reserve request which is transmitted within the second slot allocated to the first node;
receiving a third downstream signal transmitted from the first communication controller at the first node, said third downstream signal received subsequent to transmission of the reserve request, said third downstream signal comprising an allocation of resources for transmitting a packetized message; and
transmitting the packetized message from the first node to the first communication controller subsequent to receiving the third downstream signal, wherein the availability of said second slot allocated to the first node recurs until use of the second slot by the first node is disabled.

82. The method of claim 81,
wherein the first communication controller transmits information comprising an allocation of a third slot to a second node for transmitting an additional reserve request,
wherein the additional reserve request transmitted by the second node into the third slot allocated to the second node that can be transmitted during transmission of the packetized message by the first node,
wherein said additional reserve request transmitted by the second node is transmitted on a differing frequency than said packetized message transmitted by the first node.

83. The method of claim 81,
wherein the first communication controller transmits information comprising an allocation of a third slot to a second node for transmitting an additional reserve request,
wherein the additional reserve request transmitted by the second node into the third slot allocated to the second node can be transmitted during transmission of the packetized message by the first node.

84. The method of claim 81,
wherein the first upstream signal is transmitted on a first frequency;
wherein the first downstream signal is received on a second frequency which differs from the first frequency;
wherein the third upstream signal is transmitted on a third frequency which differs from the first frequency and the second frequency.

85. The method of claim 81,
wherein the first upstream signal is transmitted on a first frequency;
wherein the first downstream signal is received on a second frequency which differs from the first frequency;
wherein the third downstream signal is received on a third frequency which differs from the first frequency and the second frequency.

86. The method of claim 81,
wherein the first upstream signal is transmitted on a first frequency;
wherein the first downstream signal is received on a second frequency which differs from the first frequency;
wherein the third upstream signal is transmitted on a third frequency which differs from the first frequency and the second frequency; and
wherein the third downstream signal is received on a fourth frequency which differs from the first frequency, the second frequency and the third frequency.

87. The method of claim 81,
wherein the packetized message comprises data packets;
wherein the data packets may include information related to a sequence number, and
wherein a final data packet from the packetized message may further comprise information related to terminal indication information indicating that the final data packet is a last data packet.

88. The method of claim 81, wherein said third downstream signal is provided to the first node in recurring subsequent downstream transmissions.

89. A method of operating a data communication system, the data communication system comprising a network which includes at least one communication controller and at least one node, the method comprising:

transmitting a first upstream signal from a first node to a first communication controller, said first upstream signal comprising a random access request in a first slot, wherein said first upstream signal comprises randomly generated information from the first node;
receiving a first downstream signal transmitted from the first communication controller at the first node, said first downstream signal being received subsequent to transmission of the first upstream signal, said first downstream signal acknowledging receipt of said first upstream signal, said first downstream signal comprising information referencing a first slot number wherein the first node transmitted said random access request, said first downstream signal further comprising a return of said randomly generated information to the first node,
wherein said information referencing the first slot number and said randomly generated information are sent from the first communication controller in order for the first node to identify that the first node is a desired recipient of the first downstream signal;
transmitting a second upstream signal from the first node to the first communication controller, said second upstream signal being transmitted subsequent to receiving said first downstream signal, said second upstream signal from the first node comprising identifier information for the first node;
receiving second downstream signaling information transmitted from the first communication controller at the first node, said second downstream signaling information being received subsequent to transmission of the second upstream signal, said second downstream signaling information comprising an allocation of at least a plurality of frequencies for the first node to utilize for transmitting and receiving signals, said second downstream signaling information further comprising an allocation of a second slot to the first node for transmitting a reserve request;
transmitting a third upstream signal from the first node to the first communication controller, said third upstream signal being transmitted subsequent to receiving the second downstream signaling information, said third upstream signal comprising the reserve request which is transmitted within the second slot allocated to the first node;
receiving a third downstream signal transmitted from the first communication controller at the first node, said third downstream signal received subsequent to transmission of the reserve request, said third downstream signal comprising an allocation of resources for transmitting a packetized message; and
transmitting the packetized message from the first node to the first communication controller subsequent to receiving the third downstream signal,
wherein the availability of said second slot allocated to the first node recurs until use of the second slot by the first node is disabled.

90. The method of claim 89,
wherein the first communication controller transmits information comprising an allocation of a third slot to a second node for transmitting an additional reserve request,
wherein the additional reserve request transmitted by the second node into the third slot allocated to the second node that can be transmitted during transmission of the packetized message by the first node, wherein said additional reserve request transmitted by the second node is transmitted on a differing frequency than said packetized message transmitted by the first node.

91. The method of claim 89,
wherein the first communication controller transmits information comprising an allocation of a third slot to a second node for transmitting an additional reserve request,
wherein the additional reserve request transmitted by the second node into the third slot allocated to the second node can be transmitted during transmission of the packetized message by the first node.

92. The method of claim 89,
wherein the first upstream signal is transmitted on a first frequency;
wherein the first downstream signal is received on a second frequency which differs from the first frequency;
wherein the third upstream signal is transmitted on a third frequency which differs from the first frequency and the second frequency.

93. The method of claim 89,
wherein the first upstream signal is transmitted on a first frequency;
wherein the first downstream signal is received on a second frequency which differs from the first frequency;
wherein the third downstream signal is received on a third frequency which differs from the first frequency and the second frequency.

94. The method of claim 89,
wherein the first upstream signal is transmitted on a first frequency;
wherein the first downstream signal is received on a second frequency which differs from the first frequency;
wherein the third upstream signal is transmitted on a third frequency which differs from the first frequency and the second frequency; and
wherein the third downstream signal is received on a fourth frequency which differs from the first frequency, the second frequency and the third frequency.

95. The method of claim 89,
wherein the packetized message comprises data packets;
wherein the data packets may include information related to a sequence number, and
wherein a final data packet from the packetized message may further comprise information related to terminal indication information indicating that the final data packet is a last data packet.

96. The method of claim 89,
wherein said third downstream signal is provided to the first node in recurring subsequent downstream transmissions,
wherein the third downstream signal which recurs in subsequent downstream transmissions may be disabled through de-allocation of this resource such that the first node no longer receives recurring allocation of this resource.

97. A method of operating a data communication system, the data communication system comprising a network which includes at least one communication controller and at least one node, the method comprising:
receiving a first upstream signal transmitted from a first node to a first communication controller, said first upstream signal comprising a random access request in a first slot from the first node;
transmitting a first downstream signal from the first communication controller at the first node, said first downstream signal being transmitted subsequent to reception of the first upstream signal, said first downstream signal comprising information which acknowledges receipt of said first upstream signal, said first downstream signal comprising information referencing a first slot number wherein the first node transmitted said random access request in order for the first node to identify that the first node is a desired recipient of the first downstream signal;
receiving a second upstream signal transmitted from the first node to the first communication controller, said second upstream signal being received subsequent to the transmission of said first downstream signal, said second upstream signal from the first node comprising identifier information for the first node;
transmitting a second downstream signaling information from the first communication controller at the first node, said second downstream signaling information being transmitted subsequent to the reception of said second upstream signal, said second downstream signaling information comprising an allocation of a second slot to the first node for transmitting a reserve request;
receiving a third upstream signal transmitted from the first node to the first communication controller, said third upstream signal being received subsequent to the transmission of the second downstream signaling information, said third upstream signal comprising the reserve request from the first node which is transmitted within the second slot allocated to the first node;
transmitting a third downstream signal from the first communication controller at the first node, said third downstream signal being transmitted subsequent to the reception of the reserve request, said third downstream signal comprising an allocation of resources to the first node for the first node to transmit a packetized message; and
receiving the packetized message transmitted from the first node to the first communication controller subsequent to the transmission of the third downstream signal,
wherein the availability of said second slot allocated to the first node recurs until use of the second slot by the first node is disabled.

98. The method of claim 97,
wherein the first communication controller transmits information comprising an allocation of a third slot to a second node for transmitting an additional reserve request,
wherein the additional reserve request from the second node can be received during reception of the packetized message by the first node,
wherein the additional reserve request is received in the third slot allocated to the second node by the first communication controller,
wherein said additional reserve request received from the second node is received on a differing frequency than said packetized message received from the first node.

99. The method of claim 97,
wherein the first communication controller transmits information comprising an allocation of a third slot to a second node for transmitting an additional reserve request,
wherein the additional reserve request from the second node can be received during reception of the packetized message by the first node,
wherein the additional reserve request is received in the third slot allocated to the second node by the first communication controller.

100. The method of claim 97,
wherein the first upstream signal is received on a first frequency;

wherein the first downstream signal is transmitted on a second frequency which differs from the first frequency;
wherein the third upstream signal is received on a third frequency which differs from the first frequency and the second frequency.

101. The method of claim 97,
wherein the first upstream signal is received on a first frequency;
wherein the first downstream signal is transmitted on a second frequency which differs from the first frequency;
wherein the third downstream signal is transmitted on a third frequency which differs from the first frequency and the second frequency.

102. The method of claim 97,
wherein the first upstream signal is received on a first frequency;
wherein the first downstream signal is transmitted on a second frequency which differs from the first frequency;
wherein the third upstream signal is received on a third frequency which differs from the first frequency and the second frequency; and
wherein the third downstream signal is transmitted on a fourth frequency which differs from the first frequency, the second frequency and the third frequency.

103. The method of claim 97,
wherein the packetized message comprises data packets;
wherein the data packets may include information related to a sequence number, and
wherein a final data packet from the packetized message may further comprise information related to terminal indication information indicating that the final data packet is a last data packet.

104. The method of claim 97,
wherein said third downstream signal is provided to the first node in recurring subsequent downstream transmissions,
wherein the third downstream signal which recurs in subsequent downstream transmissions may be disabled through de-allocation of this resource such that the first node no longer receives recurring allocation of this resource.

105. A method of operating a data communication system, the data communication system comprising a network which includes at least one communication controller and at least one node, the method comprising:
receiving a first upstream signal transmitted from a first node to a first communication controller, said first upstream signal comprising a random access request in a first slot from the first node;
transmitting a first downstream signal from the first communication controller at the first node, said first downstream signal being transmitted subsequent to reception of the first upstream signal, said first downstream signal comprising information which acknowledges receipt of said first upstream signal, said first downstream signal comprising information referencing a first slot number wherein the first node transmitted said random access request in order for the first node to identify that the first node is a desired recipient of the first downstream signal;
receiving a second upstream signal transmitted from the first node to the first communication controller, said second upstream signal being received subsequent to the transmission of said first downstream signal, said second upstream signal from the first node comprising identifier information for the first node;
transmitting a second downstream signaling information from the first communication controller at the first node, said second downstream signaling information being transmitted subsequent to the reception of said second upstream signal, said second downstream signaling information comprising an allocation of at least a plurality of frequencies for the first node to utilize for transmitting and receiving signals, said second downstream signaling information further comprising an allocation of a second slot to the first node for transmitting a reserve request;
receiving a third upstream signal transmitted from the first node to the first communication controller, said third upstream signal being received subsequent to the transmission of the second downstream signaling information, said third upstream signal comprising the reserve request from the first node which is transmitted within the second slot allocated to the first node;
transmitting a third downstream signal from the first communication controller at the first node, said third downstream signal being transmitted subsequent to the reception of the reserve request, said third downstream signal comprising an allocation of resources to the first node for the first node to transmit a packetized message; and
receiving the packetized message transmitted from the first node to the first communication controller subsequent to the transmission of the third downstream signal,
wherein the availability of said second slot allocated to the first node recurs until use of the second slot by the first node is disabled.

106. The method of claim 105,
wherein the first communication controller transmits information comprising an allocation of a third slot to a second node for transmitting an additional reserve request,
wherein the additional reserve request from the second node can be received during reception of the packetized message by the first node,
wherein the additional reserve request is received in the third slot allocated to the second node by the first communication controller,
wherein said additional reserve request received from the second node is received on a differing frequency than said packetized message received from the first node.

107. The method of claim 105,
wherein the first communication controller transmits information comprising an allocation of a third slot to a second node for transmitting an additional reserve request,
wherein the additional reserve request from the second node can be received during reception of the packetized message by the first node,
wherein the additional reserve request is received in the third slot allocated to the second node by the first communication controller.

108. The method of claim 105,
wherein the first upstream signal is received on a first frequency;
wherein the first downstream signal is transmitted on a second frequency which differs from the first frequency;
wherein the third upstream signal is received on a third frequency which differs from the first frequency and the second frequency.

109. The method of claim 105,
wherein the first upstream signal is received on a first frequency;
wherein the first downstream signal is transmitted on a second frequency which differs from the first frequency;

wherein the third downstream signal is transmitted on a third frequency which differs from the first frequency and the second frequency.

110. The method of claim 105,
wherein the first upstream signal is received on a first frequency;
wherein the first downstream signal is transmitted on a second frequency which differs from the first frequency;
wherein the third upstream signal is received on a third frequency which differs from the first frequency and the second frequency; and
wherein the third downstream signal is transmitted on a fourth frequency which differs from the first frequency, the second frequency and the third frequency.

111. The method of claim 105,
wherein the packetized message comprises data packets;
wherein the data packets may include information related to a sequence number, and
wherein a final data packet from the packetized message may further comprise information related to terminal indication information indicating that the final data packet is a last data packet.

112. The method of claim 105, wherein said third downstream signal is provided to the first node in recurring subsequent downstream transmissions.

113. A method of operating a data communication system, the data communication system comprising a network which includes at least one communication controller and at least one node, the method comprising:
receiving a first downstream signal transmitted from a first communication controller at a first node, said first downstream signal authorizing communication from the first node;
transmitting a first upstream signal from the first node to the first communication controller, said first upstream signal being transmitted subsequent to receiving said first downstream signal, said first upstream signal being transmitted to acknowledge receipt of said authorization for communication;
receiving a second downstream signal transmitted from the first communication controller at the first node, said second downstream signal being received subsequent to transmission of the first upstream signal, said second downstream signal comprising an allocation of a slot to the first node for transmitting a reserve request;
transmitting a second upstream signal from the first node to the first communication controller, said second upstream signal being transmitted subsequent to receiving the second downstream signal, said second upstream signal comprising the reserve request which is transmitted within the slot allocated to the first node;
receiving a third downstream signal transmitted from the first communication controller at the first node, said third downstream signal received subsequent to transmission of the reserve request, said third downstream signal comprising an allocation of resources for transmitting a packetized message; and
transmitting the packetized message from the first node to the first communication controller subsequent to receiving the third downstream signal,
wherein the packetized message comprises data packets;
wherein the availability of said slot allocated to the first node recurs until use of the slot by the first node is disabled.

114. The method of claim 113,
wherein the first communication controller transmits information comprising an allocation of an additional slot to a second node for transmitting an additional reserve request,
wherein the additional reserve request transmitted by the second node into the additional slot allocated to the second node that can be transmitted during transmission of the packetized message by the first node,
wherein said additional reserve request transmitted by the second node is transmitted on a differing frequency than said packetized message transmitted by the first node.

115. The method of claim 113,
wherein the first communication controller transmits information comprising an allocation of an additional slot to a second node for transmitting an additional reserve request,
wherein the additional reserve request transmitted by the second node into the additional slot allocated to the second node can be transmitted during transmission of the packetized message by the first node.

116. The method of claim 113,
wherein the availability of the slot to the first node may be disabled through de-allocation of the slot such that the slot is not available to the first node to transmit a subsequent reserve request.

117. The method of claim 116,
wherein said third downstream signal is provided to the first node in recurring subsequent downstream transmissions,
wherein the third downstream signal which recurs in subsequent downstream transmissions may be disabled through de-allocation of this resource such that the first node no longer receives recurring allocation of this resource.

118. The method of claim 113,
wherein the first downstream signal is received on a first frequency;
wherein the second upstream signal is transmitted on a second frequency which differs from the first frequency; and
wherein the third downstream signal is received on a third frequency which differs from the first frequency and the second frequency.

119. The method of claim 113,
wherein the data packets may include information related to a sequence number, and
wherein a final data packet from the packetized message may further comprise information related to terminal indication information indicating that the final data packet is a last data packet.

120. The method of claim 113, wherein said third downstream signal is provided to the first node in recurring subsequent downstream transmissions.

121. A method of operating a data communication system, the data communication system comprising a network which includes at least one communication controller and at least one node, the method comprising:
transmitting a first downstream signal from a first communication controller at a first node, said first downstream signal authorizing communication from the first node;
receiving a first upstream signal transmitted from the first node to the communication controller, said first upstream signal being received subsequent to the transmission of said first downstream signal, said first upstream signal from the first node acknowledging receipt of said authorization for communication;

transmitting a second downstream signal from the first communication controller at the first node, said second downstream signal being transmitted subsequent to the reception of said first upstream signal, said second downstream signal comprising an allocation of a slot to the first node for transmitting a reserve request;

receiving a second upstream signal transmitted from the first node to the first communication controller, said second upstream signal being received subsequent to the transmission of the second downstream signal, said second upstream signal comprising the reserve request from the first node which is transmitted within the slot allocated to the first node;

transmitting a third downstream signal from the first communication controller at the first node, said third downstream signal being transmitted subsequent to the reception of the reserve request, said third downstream signal comprising an allocation of resources to the first node for the first node to transmit a packetized message; and receiving the packetized message transmitted from the first node to the first communication controller subsequent to the transmission of the third downstream signal, wherein the packetized message comprises data packets;

wherein the availability of said slot allocated to the first node recurs until use of the slot by the first node is disabled.

122. The method of claim 121, wherein the first communication controller transmits information comprising an allocation of an additional slot to a second node for transmitting an additional reserve request, wherein the additional reserve request from the second node can be received during reception of the packetized message by the first node, wherein the additional reserve request is received in the additional slot allocated to the second node by the first communication controller, wherein said additional reserve request received from the second node is received on a differing frequency than said packetized message received from the first node.

123. The method of claim 121, wherein the first communication controller transmits information comprising an allocation of an additional slot to a second node for transmitting an additional reserve request, wherein the additional reserve request from the second node can be received during reception of the packetized message by the first node, wherein the additional reserve request is received in additional slot allocated to the second node by the first communication controller.

124. The method of claim 121, wherein the availability of the slot to the first node may be disabled through de-allocation of the slot such that the slot is not available to the first node to transmit a subsequent reserve request.

125. The method of claim 124, wherein said third downstream signal is provided to the first node in recurring subsequent downstream transmissions, wherein the third downstream signal which recurs in subsequent downstream transmissions may be disabled through de-allocation of this resource such that the first node no longer receives recurring allocation of this resource.

126. The method of claim 121, wherein the first downstream signal is transmitted on a first frequency;

wherein the second upstream signal is received on a second frequency which differs from the first frequency; and wherein the third downstream signal is transmitted on a third frequency which differs from the first frequency and the second frequency.

127. The method of claim 121, wherein the data packets may include information related to a sequence number, and wherein a final data packet from the packetized message may further comprise information related to terminal indication information indicating that the final data packet is a last data packet.

128. The method of claim 121, wherein said third downstream signal is provided to the first node in recurring subsequent downstream transmissions.

129. A method of operating a data communication system, the data communication system comprising a network which includes at least one communication controller and at least one node, the method comprising:

transmitting a first upstream signal from a first node to a first communication controller, said first upstream signal comprising a request in a first slot;

receiving a first downstream signal transmitted from the first communication controller at the first node, said first downstream signal being received subsequent to transmission of the first upstream signal, said first downstream signal authorizing further communication from the first node;

transmitting a second upstream signal from the first node to the first communication controller, said second upstream signal being transmitted subsequent to receiving said first downstream signal, said second upstream signal being transmitted to acknowledge receipt of said authorization for further communication;

receiving a second downstream signal transmitted from the first communication controller at the first node, said second downstream signal being received subsequent to transmission of the second upstream signal, said second downstream signaling information comprising an allocation of at least a plurality of frequencies for the first node to utilize for transmitting and receiving signals, said second downstream signaling information further comprising an allocation of a second slot to the first node for transmitting a reserve request;

transmitting a third upstream signal from the first node to the first communication controller, said third upstream signal being transmitted subsequent to receiving the second downstream signal, said third upstream signal comprising the reserve request which is transmitted within the second slot allocated to the first node;

receiving a third downstream signal transmitted from the first communication controller at the first node, said third downstream signal received subsequent to transmission of the reserve request, said third downstream signal comprising an allocation of resources for transmitting a packetized message; and transmitting the packetized message from the first node to the first communication controller subsequent to receiving the third downstream signal, wherein the packetized message comprises data packets;

wherein the availability of said second slot allocated to the first node recurs until use of the second slot by the first node is disabled.

130. The method of claim 129,
wherein the first communication controller transmits information comprising an allocation of a third slot to a second node for transmitting an additional reserve request,
wherein the additional reserve request transmitted by the second node into the third slot allocated to the second node that can be transmitted during transmission of the packetized message by the first node,
wherein said additional reserve request transmitted by the second node is transmitted on a differing frequency than said packetized message transmitted by the first node.

131. The method of claim 129,
wherein the first communication controller transmits information comprising an allocation of a third slot to a second node for transmitting an additional reserve request,
wherein the additional reserve request transmitted by the second node into the third slot allocated to the second node can be transmitted during transmission of the packetized message by the first node.

132. The method of claim 129,
wherein the first upstream signal is transmitted on a first frequency;
wherein the first downstream signal is received on a second frequency which differs from the first frequency;
wherein the third upstream signal is transmitted on a third frequency which differs from the first frequency and the second frequency.

133. The method of claim 129,
wherein the first upstream signal is transmitted on a first frequency;
wherein the first downstream signal is received on a second frequency which differs from the first frequency;
wherein the third downstream signal is received on a third frequency which differs from the first frequency and the second frequency.

134. The method of claim 129,
wherein the first upstream signal is transmitted on a first frequency;
wherein the first downstream signal is received on a second frequency which differs from the first frequency;
wherein the third upstream signal is transmitted on a third frequency which differs from the first frequency and the second frequency; and
wherein the third downstream signal is received on a fourth frequency which differs from the first frequency, the second frequency and the third frequency.

135. The method of claim 129,
wherein the data packets may include information related to a sequence number, and
wherein a final data packet from the packetized message may further comprise information related to terminal indication information indicating that the final data packet is a last data packet.

136. The method of claim 129, wherein said third downstream signal is provided to the first node in recurring subsequent downstream transmissions.

137. A method of operating a data communication system, the data communication system comprising a network which includes at least one communication controller and at least one node, the method comprising:
receiving a first upstream signal transmitted from a first node to a first communication controller, said first upstream signal comprising a request in a first slot from the first node;
transmitting a first downstream signal from the first communication controller at the first node, said first downstream signal being transmitted subsequent to reception of the first upstream signal, said first downstream signal authorizing further communication from the first node;
receiving a second upstream signal transmitted from the first node to the communication controller, said second upstream signal being received subsequent to the transmission of said first downstream signal, said second upstream signal from the first node acknowledging receipt of said authorization for further communication;
transmitting a second downstream signal from the first communication controller at the first node, said second downstream signal being transmitted subsequent to the reception of said second upstream signal, said second downstream signaling information comprising an allocation of at least a plurality of frequencies for the first node to utilize for transmitting and receiving signals, said second downstream signaling information further comprising an allocation of a second slot to the first node for transmitting a reserve request;
receiving a third upstream signal transmitted from the first node to the first communication controller, said third upstream signal being received subsequent to the transmission of the second downstream signal, said third upstream signal comprising the reserve request from the first node which is transmitted within the second slot allocated to the first node;
transmitting a third downstream signal from the first communication controller at the first node, said third downstream signal being transmitted subsequent to the reception of the reserve request, said third downstream signal comprising an allocation of resources to the first node for the first node to transmit a packetized message; and
receiving the packetized message transmitted from the first node to the first communication controller subsequent to the transmission of the third downstream signal,
wherein the packetized message comprises data packets;
wherein the availability of said second slot allocated to the first node recurs until use of the second slot by the first node is disabled.

138. The method of claim 137,
wherein the first communication controller transmits information comprising an allocation of a third slot to a second node for transmitting an additional reserve request,
wherein the additional reserve request from the second node can be received during reception of the packetized message by the first node,
wherein the additional reserve request is received in the third slot allocated to the second node by the first communication controller,
wherein said additional reserve request received from the second node is received on a differing frequency than said packetized message received from the first node.

139. The method of claim 137,
wherein the first communication controller transmits information comprising an allocation of a third slot to a second node for transmitting an additional reserve request,
wherein the additional reserve request from the second node can be received during reception of the packetized message by the first node,
wherein the additional reserve request is received in the third slot allocated to the second node by the first communication controller.

140. The method of claim 137,
wherein the first upstream signal is received on a first frequency;
wherein the first downstream signal is transmitted on a second frequency which differs from the first frequency;
wherein the third upstream signal is received on a third frequency which differs from the first frequency and the second frequency.

141. The method of claim 137,
wherein the first upstream signal is received on a first frequency;
wherein the first downstream signal is transmitted on a second frequency which differs from the first frequency;
wherein the third downstream signal is transmitted on a third frequency which differs from the first frequency and the second frequency.

142. The method of claim 137,
wherein the first upstream signal is received on a first frequency;
wherein the first downstream signal is transmitted on a second frequency which differs from the first frequency;
wherein the third upstream signal is received on a third frequency which differs from the first frequency and the second frequency; and
wherein the third downstream signal is transmitted on a fourth frequency which differs from the first frequency, the second frequency and the third frequency.

143. The method of claim 137,
wherein the data packets may include information related to a sequence number, and
wherein a final data packet from the packetized message may further comprise information related to terminal indication information indicating that the final data packet is a last data packet.

144. The method of claim 137, wherein said third downstream signal is provided to the first node in recurring subsequent downstream transmissions.

145. A method of operating a data communication system, the data communication system comprising a network which includes at least one communication controller and at least one node, the method comprising:
transmitting a first upstream signal from a first node to a first communication controller, said first upstream signal comprising a random access request in a first slot;
receiving a first downstream signal transmitted from the first communication controller at the first node, said first downstream signal being received subsequent to transmission of the first upstream signal, said first downstream signal acknowledging receipt of said first upstream signal;
transmitting a second upstream signal from the first node to the first communication controller, said second upstream signal being transmitted subsequent to receiving said first downstream signal, said second upstream signal from the first node comprising identifier information for the first node;
receiving second downstream signaling information transmitted from the first communication controller at the first node, said second downstream signaling information being received subsequent to transmission of the second upstream signal, said second downstream signaling information comprising an allocation of at least a plurality of frequencies for the first node to utilize for transmitting and receiving signals, said second downstream signaling information further comprising an allocation of a second slot to the first node for transmitting a reserve request;
transmitting a third upstream signal from the first node to the first communication controller, said third upstream signal being transmitted subsequent to receiving the second downstream signaling information, said third upstream signal comprising the reserve request which is transmitted within the second slot allocated to the first node;
receiving a third downstream signal transmitted from the first communication controller at the first node, said third downstream signal received subsequent to transmission of the reserve request, said third downstream signal comprising an allocation of resources for transmitting a packetized message; wherein said third downstream signal is provided to the first node in recurring subsequent downstream transmissions; and
transmitting the packetized message from the first node to the first communication controller subsequent to receiving the third downstream signal;
wherein the availability of said second slot allocated to the first node recurs until use of the second slot by the first node is disabled,
wherein the first communication controller transmits information comprising an allocation of a third slot to a second node for transmitting an additional reserve request,
wherein the additional reserve request from the second node can be transmitted during transmission of the packetized message by the first node,
wherein the additional reserve request is transmitted in the third slot allocated to the second node by the first communication controller.

146. The method of claim 145,
wherein said additional reserve request transmitted by the second node is transmitted on a differing frequency than said packetized message transmitted by the first node.

147. The method of claim 146,
wherein the first upstream signal is transmitted on a first frequency;
wherein the first downstream signal is received on a second frequency which differs from the first frequency;
wherein the third upstream signal is transmitted on a third frequency which differs from the first frequency and the second frequency.

148. The method of claim 146,
wherein the first upstream signal is transmitted on a first frequency;
wherein the first downstream signal is received on a second frequency which differs from the first frequency;
wherein the third downstream signal is received on a third frequency which differs from the first frequency and the second frequency.

149. The method of claim 146,
wherein the first upstream signal is transmitted on a first frequency;
wherein the first downstream signal is received on a second frequency which differs from the first frequency;
wherein the third upstream signal is transmitted on a third frequency which differs from the first frequency and the second frequency; and
wherein the third downstream signal is received on a fourth frequency which differs from the first frequency, the second frequency and the third frequency.

150. The method of claim 146,
wherein the packetized message comprises data packets;
wherein the data packets may include information related to a sequence number, and wherein a final data packet from the packetized message may further comprise information related to terminal indication information indicating that the final data packet is a last data packet.

151. The method of claim 145,
wherein the first upstream signal is transmitted on a first frequency;
wherein the first downstream signal is received on a second frequency which differs from the first frequency;
wherein the third upstream signal is transmitted on a third frequency which differs from the first frequency and the second frequency.

152. The method of claim 145,
wherein the first upstream signal is transmitted on a first frequency;
wherein the first downstream signal is received on a second frequency which differs from the first frequency;
wherein the third downstream signal is received on a third frequency which differs from the first frequency and the second frequency.

153. The method of claim 145,
wherein the first upstream signal is transmitted on a first frequency;
wherein the first downstream signal is received on a second frequency which differs from the first frequency;
wherein the third upstream signal is transmitted on a third frequency which differs from the first frequency and the second frequency; and
wherein the third downstream signal is received on a fourth frequency which differs from the first frequency, the second frequency and the third frequency.

154. The method of claim 145,
wherein the packetized message comprises data packets;
wherein the data packets may include information related to a sequence number, and
wherein a final data packet from the packetized message may further comprise information related to terminal indication information indicating that the final data packet is a last data packet.

155. A method of operating a data communication system, the data communication system comprising a network which includes at least one communication controller and at least one node, the method comprising:
receiving a first upstream signal transmitted from a first node to a first communication controller, said first upstream signal comprising a random access request in a first slot from the first node;
transmitting a first downstream signal from the first communication controller at the first node, said first downstream signal being transmitted subsequent to reception of the first upstream signal, said first downstream signal comprising information which acknowledges receipt of said first upstream signal, said first downstream signal comprising information referencing a first slot number wherein the first node transmitted said random access request in order for the first node to identify that the first node is a desired recipient of the first downstream signal;
receiving a second upstream signal transmitted from the first node to the first communication controller, said second upstream signal being received subsequent to the transmission of said first downstream signal, said second upstream signal from the first node comprising identifier information for the first node;
transmitting a second downstream signaling information from the first communication controller at the first node, said second downstream signaling information being transmitted subsequent to the reception of said second upstream signal, said second downstream signaling information comprising an allocation of at least a plurality of frequencies for the first node to utilize for transmitting and receiving signals, said second downstream signaling information further comprising an allocation of a second slot to the first node for transmitting a reserve request;
receiving a third upstream signal transmitted from the first node to the first communication controller, said third upstream signal being received subsequent to the transmission of the second downstream signaling information, said third upstream signal comprising the reserve request from the first node which is transmitted within the second slot allocated to the first node;
transmitting a third downstream signal from the first communication controller at the first node, said third downstream signal being transmitted subsequent to the reception of the reserve request, said third downstream signal comprising an allocation of resources to the first node for the first node to transmit a packetized message, wherein said third downstream signal is provided to the first node in recurring subsequent downstream transmissions; and
receiving the packetized message transmitted from the first node to the first communication controller subsequent to the transmission of the third downstream signal,
wherein the availability of said second slot allocated to the first node recurs until use of the second slot by the first node is disabled,
wherein the first communication controller transmits information comprising an allocation of a third slot to a second node for transmitting an additional reserve request,
wherein the additional reserve request from the second node can be received during reception of the packetized message by the first node,
wherein the additional reserve request is received in the third slot allocated to the second node by the first communication controller.

156. The method of claim 155,
wherein said additional reserve request received from the second node is received on a differing frequency than said packetized message received from the first node.

157. The method of claim 156,
wherein the first upstream signal is received on a first frequency;
wherein the first downstream signal is transmitted on a second frequency which differs from the first frequency;
wherein the third upstream signal is received on a third frequency which differs from the first frequency and the second frequency.

158. The method of claim 156,
wherein the first upstream signal is received on a first frequency;
wherein the first downstream signal is transmitted on a second frequency which differs from the first frequency;
wherein the third downstream signal is transmitted on a third frequency which differs from the first frequency and the second frequency.

159. The method of claim 156,
wherein the first upstream signal is received on a first frequency;
wherein the first downstream signal is transmitted on a second frequency which differs from the first frequency;
wherein the third upstream signal is received on a third frequency which differs from the first frequency and the second frequency; and wherein the third downstream signal is transmitted on a fourth frequency which differs from the first frequency, the second frequency and the third frequency.

160. The method of claim 156,
wherein the packetized message comprises data packets;
wherein the data packets may include information related to a sequence number, and
wherein a final data packet from the packetized message may further comprise information related to terminal indication information indicating that the final data packet is a last data packet.

161. The method of claim 155,
wherein the first upstream signal is received on a first frequency;
wherein the first downstream signal is transmitted on a second frequency which differs from the first frequency;
wherein the third upstream signal is received on a third frequency which differs from the first frequency and the second frequency.

162. The method of claim 155,
wherein the first upstream signal is received on a first frequency;
wherein the first downstream signal is transmitted on a second frequency which differs from the first frequency;
wherein the third downstream signal is transmitted on a third frequency which differs from the first frequency and the second frequency.

163. The method of claim 155,
wherein the first upstream signal is received on a first frequency;
wherein the first downstream signal is transmitted on a second frequency which differs from the first frequency;
wherein the third upstream signal is received on a third frequency which differs from the first frequency and the second frequency; and
wherein the third downstream signal is transmitted on a fourth frequency which differs from the first frequency, the second frequency and the third frequency.

164. The method of claim 155,
wherein the packetized message comprises data packets;
wherein the data packets may include information related to a sequence number, and
wherein a final data packet from the packetized message may further comprise information related to terminal indication information indicating that the final data packet is a last data packet.

165. A method of operating a data communication system, the data communication system comprising a network which includes at least one communication controller and at least one node, the method comprising:
transmitting a first upstream signal from a first node to a first communication controller, said first upstream signal comprising a random access request in a first slot;
receiving a first downstream signal transmitted from the first communication controller at the first node, said first downstream signal being received subsequent to transmission of the first upstream signal, said first downstream signal acknowledging receipt of said first upstream signal;
transmitting a second upstream signal from the first node to the first communication controller, said second upstream signal being transmitted subsequent to receiving said first downstream signal, said second upstream signal from the first node comprising identifier information for the first node;
receiving second downstream signaling information transmitted from the first communication controller at the first node, said second downstream signaling information being received subsequent to transmission of the second upstream signal, said second downstream signaling information comprising an allocation of a second slot to the first node for transmitting a reserve request;
transmitting a third upstream signal from the first node to the first communication controller, said third upstream signal being transmitted subsequent to receiving the second downstream signaling information, said third upstream signal comprising the reserve request which is transmitted within the second slot allocated to the first node;
receiving a third downstream signal transmitted from the first communication controller at the first node, said third downstream signal received subsequent to transmission of the reserve request, said third downstream signal comprising an allocation of resources for transmitting a packetized message, wherein said third downstream signal is provided to the first node in recurring subsequent downstream transmissions; and
transmitting the packetized message from the first node to the first communication controller subsequent to receiving the third downstream signal;
wherein the availability of said second slot allocated to the first node recurs until use of the second slot by the first node is disabled,
wherein the availability of the second slot to the first node may be disabled through de-allocation of the second slot such that the second slot is not available to the first node to transmit a subsequent reserve request,
wherein the first communication controller transmits information comprising an allocation of a third slot to a second node for transmitting an additional reserve request,
wherein the additional reserve request from the second node can be transmitted during transmission of the packetized message by the first node,
wherein the additional reserve request is transmitted in the third slot allocated to the second node by the first communication controller.

166. The method of claim 165,
wherein said additional reserve request transmitted by the second node is transmitted on a differing frequency than said packetized message transmitted by the first node.

167. The method of claim 166,
wherein the first upstream signal is transmitted on a first frequency;
wherein the first downstream signal is received on a second frequency which differs from the first frequency;
wherein the third upstream signal is transmitted on a third frequency which differs from the first frequency and the second frequency.

168. The method of claim 166,
wherein the first upstream signal is transmitted on a first frequency;
wherein the first downstream signal is received on a second frequency which differs from the first frequency;
wherein the third downstream signal is received on a third frequency which differs from the first frequency and the second frequency.

169. The method of claim 166,
wherein the first upstream signal is transmitted on a first frequency;
wherein the first downstream signal is received on a second frequency which differs from the first frequency;

wherein the third upstream signal is transmitted on a third frequency which differs from the first frequency and the second frequency; and
wherein the third downstream signal is received on a fourth frequency which differs from the first frequency, the second frequency and the third frequency.

170. The method of claim 166,
wherein the packetized message comprises data packets;
wherein the data packets may include information related to a sequence number, and
wherein a final data packet from the packetized message may further comprise information related to terminal indication information indicating that the final data packet is a last data packet.

171. The method of claim 164,
wherein the first upstream signal is transmitted on a first frequency;
wherein the first downstream signal is received on a second frequency which differs from the first frequency;
wherein the third upstream signal is transmitted on a third frequency which differs from the first frequency and the second frequency.

172. The method of claim 165,
wherein the first upstream signal is transmitted on a first frequency;
wherein the first downstream signal is received on a second frequency which differs from the first frequency;
wherein the third downstream signal is received on a third frequency which differs from the first frequency and the second frequency.

173. The method of claim 165,
wherein the first upstream signal is transmitted on a first frequency;
wherein the first downstream signal is received on a second frequency which differs from the first frequency;
wherein the third upstream signal is transmitted on a third frequency which differs from the first frequency and the second frequency; and
wherein the third downstream signal is received on a fourth frequency which differs from the first frequency, the second frequency and the third frequency.

174. The method of claim 165,
wherein the packetized message comprises data packets;
wherein the data packets may include information related to a sequence number, and
wherein a final data packet from the packetized message may further comprise information related to terminal indication information indicating that the final data packet is a last data packet.

175. A method of operating a data communication system, the data communication system comprising a network which includes at least one communication controller and at least one node, the method comprising:
receiving a first upstream signal transmitted from a first node to a first communication controller, said first upstream signal comprising a random access request in a first slot from the first node;
transmitting a first downstream signal from the first communication controller at the first node, said first downstream signal being transmitted subsequent to reception of the first upstream signal, said first downstream signal comprising information which acknowledges receipt of said first upstream signal, said first downstream signal comprising information referencing a first slot number wherein the first node transmitted said random access request in order for the first node to identify that the first node is a desired recipient of the first downstream signal;
receiving a second upstream signal transmitted from the first node to the first communication controller, said second upstream signal being received subsequent to the transmission of said first downstream signal, said second upstream signal from the first node comprising identifier information for the first node;
transmitting a second downstream signaling information from the first communication controller at the first node, said second downstream signaling information being transmitted subsequent to the reception of said second upstream signal, said second downstream signaling information comprising an allocation of a second slot to the first node for transmitting a reserve request;
receiving a third upstream signal transmitted from the first node to the first communication controller, said third upstream signal being received subsequent to the transmission of the second downstream signaling information, said third upstream signal comprising the reserve request from the first node which is transmitted within the second slot allocated to the first node;
transmitting a third downstream signal from the first communication controller at the first node, said third downstream signal being transmitted subsequent to the reception of the reserve request, said third downstream signal comprising an allocation of resources to the first node for the first node to transmit a packetized message, wherein said third downstream signal is provided to the first node in recurring subsequent downstream transmissions; and
receiving the packetized message transmitted from the first node to the first communication controller subsequent to the transmission of the third downstream signal,
wherein the availability of said second slot allocated to the first node recurs until use of the second slot by the first node is disabled,
wherein the availability of the second slot to the first node may be disabled through de-allocation of the second slot such that the second slot is not available to the first node to transmit a subsequent reserve request,
wherein the first communication controller transmits information comprising an allocation of a third slot to a second node for transmitting an additional reserve request,
wherein the additional reserve request from the second node can be received during reception of the packetized message by the first node,
wherein the additional reserve request is received in the third slot allocated to the second node by the first communication controller.

176. The method of claim 175,
wherein said additional reserve request received from the second node is received on a differing frequency than said packetized message received from the first node.

177. The method of claim 176,
wherein the first upstream signal is received on a first frequency;
wherein the first downstream signal is transmitted on a second frequency which differs from the first frequency;
wherein the third upstream signal is received on a third frequency which differs from the first frequency and the second frequency.

178. The method of claim 176,
wherein the first upstream signal is received on a first frequency;
wherein the first downstream signal is transmitted on a second frequency which differs from the first frequency;

wherein the third downstream signal is transmitted on a third frequency which differs from the first frequency and the second frequency.

179. The method of claim 176,
wherein the first upstream signal is received on a first frequency;
wherein the first downstream signal is transmitted on a second frequency which differs from the first frequency;
wherein the third upstream signal is received on a third frequency which differs from the first frequency and the second frequency; and
wherein the third downstream signal is transmitted on a fourth frequency which differs from the first frequency, the second frequency and the third frequency.

180. The method of claim 176,
wherein the packetized message comprises data packets;
wherein the data packets may include information related to a sequence number, and
wherein a final data packet from the packetized message may further comprise information related to terminal indication information indicating that the final data packet is a last data packet.

181. The method of claim 175,
wherein the first upstream signal is received on a first frequency;
wherein the first downstream signal is transmitted on a second frequency which differs from the first frequency;
wherein the third upstream signal is received on a third frequency which differs from the first frequency and the second frequency.

182. The method of claim 175,
wherein the first upstream signal is received on a first frequency;
wherein the first downstream signal is transmitted on a second frequency which differs from the first frequency;
wherein the third downstream signal is transmitted on a third frequency which differs from the first frequency and the second frequency.

183. The method of claim 175,
wherein the first upstream signal is received on a first frequency;
wherein the first downstream signal is transmitted on a second frequency which differs from the first frequency;
wherein the third upstream signal is received on a third frequency which differs from the first frequency and the second frequency; and
wherein the third downstream signal is transmitted on a fourth frequency which differs from the first frequency, the second frequency and the third frequency.

184. The method of claim 175,
wherein the packetized message comprises data packets;
wherein the data packets may include information related to a sequence number, and
wherein a final data packet from the packetized message may further comprise information related to terminal indication information indicating that the final data packet is a last data packet.

185. A method of communicating data in a data network, the data network including a plurality of nodes including a first node, wherein the first node may be configured for:
receiving a first signal, the first signal including information used to align a response signal from the first node;
randomly generate information within said first node and store said randomly generated information in memory within the first node;
sending the response signal from the first node, wherein said response signal includes the randomly generated information;
receiving a second signal, wherein a portion of the second signal is derived from the randomly generated information contained in the response signal; said second signal enabling sending of a subsequent-response signal that uniquely identifies the first node;
determining whether the second signal contains information which matches the randomly generated information stored in said memory of the first node;
sending the subsequent-response signal which comprises a packet which includes identification related information of the first node, said subsequent-response signal from the first node being sent only if the portion of the second signal matches the randomly generated information that is stored in the first node;
wherein the first signal, the response signal, the second signal and the subsequent-response signal occur on a common frequency channel; and
wherein a time for sending the subsequent-response signal occurs with an alignment that is varied with respect to a time said first signal was sent.

186. The method of claim 185, wherein said packet sent from the first node within said subsequent-response signal optionally contains message information.

187. The method of claim 185, wherein message information is sent from the first node at a later period than the subsequent-response signal.

188. A method of receiving data in a data network, the data network including a controller, wherein the controller may be configured for:
transmitting a first signal from the controller, the first signal including information used to align a response signal;
receiving the response signal, wherein said response signal includes randomly generated information;
transmitting a second signal from the controller, wherein a portion of the second signal is derived from the randomly generated information contained in the response signal; said second signal enabling transmission of a subsequent-response signal;
receiving the subsequent-response signal which comprises a packet which includes identification related information;
wherein the first signal, the response signal, the second signal and the subsequent-response signal occur on a common frequency channel; and
wherein a time for receiving the subsequent-response signal occurs with an alignment that is varied with respect to a time said first signal was sent.

189. The method of claim 188, wherein said packet received within said subsequent-response signal optionally contains message information.

190. The method of claim 188, wherein message information is received at a later period than the subsequent-response signal.

191. The method of claim 188,
wherein the controller may be further configured to transmit a subsequent-second-signal, and
wherein a period in time between when the controller transmits the second signal and when the controller transmits the subsequent-second-signal varies in accordance with additional-randomly-generated-information.

* * * * *

UNITED STATES PATENT AND TRADEMARK OFFICE
CERTIFICATE OF CORRECTION

| | | |
|---|---|---|
| PATENT NO. | : 7,962,144 B2 | Page 1 of 1 |
| APPLICATION NO. | : 11/757879 | |
| DATED | : June 14, 2011 | |
| INVENTOR(S) | : Wong et al. | |

It is certified that error appears in the above-identified patent and that said Letters Patent is hereby corrected as shown below:

Claim 185, col. 53, line 59, after "A method of communicating data," REMOVE "in a data network, the data network including a plurality of nodes including a first node, wherein the first node may be configured for" and REPLACE with --the method comprising--.

Claim 188, col. 54, line 30, after "A method of receiving data," REMOVE "in a data network, the data network including a controller, wherein the controller may be configured for" and REPLACE with --the method comprising--.

Signed and Sealed this
Fourth Day of October, 2011

David J. Kappos
*Director of the United States Patent and Trademark Office*